US009153236B2

(12) United States Patent

Setiawan et al.

(10) Patent No.: US 9,153,236 B2
(45) **Date of Patent: *Oct. 6, 2015**

(54) AUDIO CODEC USING NOISE SYNTHESIS DURING INACTIVE PHASES

(71) Applicant: Fraunhofer-Gesellschaft zur Foerderung der angewandten Forschung e.V., Munich (DE)

(72) Inventors: Panji Setiawan, Erlangen (DE); Konstantin Schmidt, Nuremberg (DE); Stephan Wilde, Wendelstein (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,087

(22) Filed: Aug. 13, 2013

(65) Prior Publication Data

US 2013/0332175 A1 Dec. 12, 2013

Related U.S. Application Data

(63) Continuation of application No. PCT/EP2012/052462, filed on Feb. 14, 2012.

(60) Provisional application No. 61/442,632, filed on Feb. 14, 2011.

(51) Int. Cl.
*G06F 15/00* (2006.01)
*G10L 19/00* (2013.01)
(Continued)

(52) U.S. Cl.
CPC ................ *G10L 19/00* (2013.01); *G10K 11/16* (2013.01); *G10L 19/005* (2013.01);
(Continued)

(58) Field of Classification Search
CPC ............................ G10L 19/028; G10L 19/012
USPC ......................................... 704/200, 500–504
See application file for complete search history.

(56) References Cited

U.S. PATENT DOCUMENTS 5,414,796 A 5/1995 Jacobs et al.
5,537,510 A 7/1996 Kim
(Continued)

FOREIGN PATENT DOCUMENTS

AU 2007/312667 A1 4/2008
CN 1274456 A 11/2000
(Continued)

OTHER PUBLICATIONS

U.S. Appl. No. 13/966,048 Non-Final Office Action dated Jun. 10, 2014, 9 pages.
(Continued)

*Primary Examiner* — Douglas Godbold
(74) *Attorney, Agent, or Firm* — Allen J. Moss; Squire Patton Boggs (US) LLP

(57) ABSTRACT

A parametric background noise estimate is continuously updated during an active or non-silence phase so that the noise generation may immediately be started with upon the entrance of an inactive phase following the active phase. In accordance with another aspect, a spectral domain is very efficiently used in order to parameterize the background noise thereby yielding a background noise synthesis which is more realistic and thus leads to a more transparent active to inactive phase switching.

28 Claims, 12 Drawing Sheets

(51) Int. Cl.

| | |
|---|---|
| ***G10L 19/012*** | (2013.01) |
| ***G10K 11/16*** | (2006.01) |
| ***G10L 19/005*** | (2013.01) |
| ***G10L 19/12*** | (2013.01) |
| ***G10L 19/03*** | (2013.01) |
| ***G10L 19/22*** | (2013.01) |
| ***G10L 21/0216*** | (2013.01) |
| ***G10L 25/78*** | (2013.01) |
| *G10L 19/04* | (2013.01) |
| *G10L 19/02* | (2013.01) |
| *G10L 25/06* | (2013.01) |
| *G10L 19/025* | (2013.01) |
| *G10L 19/107* | (2013.01) |

(52) U.S. Cl.

CPC .............. *G10L 19/012* (2013.01); *G10L 19/03* (2013.01); *G10L 19/12* (2013.01); *G10L 19/22* (2013.01); *G10L 21/0216* (2013.01); *G10L 25/78* (2013.01); *G10L 19/025* (2013.01); *G10L 19/0212* (2013.01); *G10L 19/04* (2013.01); *G10L 19/107* (2013.01); *G10L 25/06* (2013.01)

(56) References Cited

U.S. PATENT DOCUMENTS

| | | | | |
|---|---|---|---|---|
| 5,606,642 | A | 2/1997 | Stautner et al. | |
| 5,754,733 | A | 5/1998 | Gardner et al. | |
| 5,848,391 | A | 12/1998 | Bosi et al. | |
| 5,953,698 | A | 9/1999 | Hayata | |
| 5,960,389 | A * | 9/1999 | Jarvinen et al. | 704/220 |
| 5,982,817 | A | 11/1999 | Wuppermann | |
| 6,070,137 | A | 5/2000 | Bloebaum et al. | |
| 6,134,518 | A | 10/2000 | Cohen et al. | |
| 6,173,257 | B1 | 1/2001 | Gao | |
| 6,236,960 | B1 | 5/2001 | Peng et al. | |
| 6,317,117 | B1 | 11/2001 | Goff | |
| 6,532,443 | B1 | 3/2003 | Nishiguchi et al. | |
| 6,757,654 | B1 | 6/2004 | Westerlund et al. | |
| 6,879,955 | B2 | 4/2005 | Rao | |
| 7,124,079 | B1 | 10/2006 | Johansson et al. | |
| 7,249,014 | B2 | 7/2007 | Kannan et al. | |
| 7,280,959 | B2 | 10/2007 | Bessette | |
| 7,343,283 | B2 | 3/2008 | Ashley et al. | |
| 7,363,218 | B2 | 4/2008 | Jabri et al. | |
| 7,519,535 | B2 | 4/2009 | Spindola | |
| 7,519,538 | B2 | 4/2009 | Villemoes et al. | |
| 7,536,299 | B2 | 5/2009 | Cheng et al. | |
| 7,610,197 | B2 | 10/2009 | Cruz-Zeno et al. | |
| 7,707,034 | B2 | 4/2010 | Sun et al. | |
| 7,747,430 | B2 | 6/2010 | Makinen | |
| 7,788,105 | B2 | 8/2010 | Miseki | |
| 7,873,511 | B2 | 1/2011 | Herre et al. | |
| 7,933,769 | B2 | 4/2011 | Bessette | |
| 7,979,271 | B2 | 7/2011 | Bessette | |
| 7,987,089 | B2 | 7/2011 | Krishnan et al. | |
| 8,121,831 | B2 | 2/2012 | Oh et al. | |
| 8,160,274 | B2 | 4/2012 | Bongiovi | |
| 8,255,207 | B2 | 8/2012 | Vaillancourt et al. | |
| 8,428,936 | B2 | 4/2013 | Mittal et al. | |
| 8,566,106 | B2 | 10/2013 | Salami et al. | |
| 8,630,862 | B2 | 1/2014 | Geiger et al. | |
| 8,630,863 | B2 | 1/2014 | Son et al. | |
| 2002/0078771 | A1 | 6/2002 | Kreichauf et al. | |
| 2002/0111799 | A1 | 8/2002 | Bernard | |
| 2002/0184009 | A1 | 12/2002 | Heikkinen | |
| 2003/0009325 | A1 | 1/2003 | Kirchherr et al. | |
| 2003/0033136 | A1 | 2/2003 | Lee | |
| 2003/0046067 | A1 | 3/2003 | Gradl | |
| 2003/0078771 | A1 | 4/2003 | Jung et al. | |
| 2003/0225576 | A1 | 12/2003 | Li et al. | |
| 2004/0093368 | A1 | 5/2004 | Lee et al. | |
| 2004/0225505 | A1 | 11/2004 | Andersen et al. | |
| 2005/0065785 | A1 | 3/2005 | Bessette | |
| 2005/0091044 | A1 | 4/2005 | Ramo et al. | |
| 2005/0096901 | A1 | 5/2005 | Uvliden et al. | |
| 2005/0130321 | A1 | 6/2005 | Nicholson et al. | |
| 2005/0131696 | A1 | 6/2005 | Wang et al. | |
| 2005/0154584 | A1 | 7/2005 | Jelinek et al. | |
| 2005/0240399 | A1 | 10/2005 | Makinen | |
| 2005/0278171 | A1 | 12/2005 | Suppappola et al. | |
| 2006/0116872 | A1 | 6/2006 | Byun et al. | |
| 2006/0206334 | A1 | 9/2006 | Kapoor et al. | |
| 2006/0271356 | A1 | 11/2006 | Vos | |
| 2006/0293885 | A1 * | 12/2006 | Gournay et al. | 704/223 |
| 2007/0016404 | A1 | 1/2007 | Kim et al. | |
| 2007/0050189 | A1 | 3/2007 | Cruz-Zeno et al. | |
| 2007/0100607 | A1 | 5/2007 | Villemoes | |
| 2007/0147518 | A1 | 6/2007 | Bessette | |
| 2007/0171931 | A1 | 7/2007 | Manjunath et al. | |
| 2007/0225971 | A1 | 9/2007 | Bessette | |
| 2007/0253577 | A1 | 11/2007 | Yen et al. | |
| 2007/0282603 | A1 | 12/2007 | Bessette | |
| 2008/0010064 | A1 | 1/2008 | Takeuchi et al. | |
| 2008/0015852 | A1 | 1/2008 | Kruger et al. | |
| 2008/0027719 | A1 | 1/2008 | Kirshnan et al. | |
| 2008/0052068 | A1 | 2/2008 | Aguilar et al. | |
| 2008/0137881 | A1 | 6/2008 | Bongiovi | |
| 2008/0147518 | A1 | 6/2008 | Haider et al. | |
| 2008/0208599 | A1 | 8/2008 | Rosec et al. | |
| 2008/0275580 | A1 | 11/2008 | Andersen | |
| 2009/0024397 | A1 | 1/2009 | Ryu et al. | |
| 2009/0204397 | A1 | 8/2009 | Den Drinker | |
| 2009/0226016 | A1 | 9/2009 | Fitz et al. | |
| 2010/0017200 | A1 | 1/2010 | Oshikiri et al. | |
| 2010/0042407 | A1 | 2/2010 | Crockett | |
| 2010/0063812 | A1 | 3/2010 | Gao | |
| 2010/0070270 | A1 | 3/2010 | Gao | |
| 2010/0076754 | A1 | 3/2010 | Kovesi et al. | |
| 2010/0138218 | A1 | 6/2010 | Geiger | |
| 2010/0198586 | A1 | 8/2010 | Edler et al. | |
| 2010/0217607 | A1 | 8/2010 | Neuendorf et al. | |
| 2011/0153333 | A1 | 6/2011 | Bessette | |
| 2011/0161088 | A1 | 6/2011 | Bayer et al. | |
| 2011/0178795 | A1 | 7/2011 | Bayer et al. | |
| 2011/0218797 | A1 | 9/2011 | Mittal et al. | |
| 2011/0218799 | A1 | 9/2011 | Mittal et al. | |
| 2011/0311058 | A1 | 12/2011 | Oh et al. | |
| 2012/0022881 | A1 | 1/2012 | Geiger et al. | |
| 2012/0226505 | A1 * | 9/2012 | Lin et al. | 704/500 |

FOREIGN PATENT DOCUMENTS

| | | | |
|---|---|---|---|
| CN | 1274456 | A | 11/2000 |
| CN | 1344067 | | 4/2002 |
| CN | 1381956 | A | 11/2002 |
| CN | 1437747 | | 8/2003 |
| CN | 1539137 | | 10/2004 |
| CN | 1539138 | | 10/2004 |
| CN | 101351840 | | 10/2006 |
| CN | 101110214 | A | 1/2008 |
| CN | 101110214 | A | 1/2008 |
| CN | 101366077 | | 2/2009 |
| CN | 101371295 | | 2/2009 |
| CN | 101379551 | A | 3/2009 |
| CN | 101388210 | A | 3/2009 |
| CN | 101388210 | A | 3/2009 |
| CN | 101425292 | | 5/2009 |
| CN | 101483043 | A | 7/2009 |
| CN | 101483043 | A | 7/2009 |
| CN | 101488344 | A | 7/2009 |
| CN | 101743587 | | 6/2010 |
| CN | 101770775 | A | 7/2010 |
| CN | 101770775 | A | 7/2010 |
| EA | 001087 | B1 | 10/2000 |
| EP | 0673566 | A1 | 9/1995 |
| EP | 0758123 | A2 | 2/1997 |
| EP | 0843301 | A2 | 5/1998 |
| EP | 1120775 | A1 | 8/2001 |
| EP | 1852851 | A1 | 11/2007 |
| EP | 2107556 | A1 | 10/2009 |
| JP | H08-181619 | A | 7/1996 |
| JP | 1039898 | A | 2/1998 |

(56) References Cited

FOREIGN PATENT DOCUMENTS

| | | | |
|---|---|---|---|
| JP | 10-214100 | A | 8/1998 |
| JP | 10-105193 | | 10/1998 |
| JP | H11502318 | A | 2/1999 |
| JP | 11-98090 | A | 4/1999 |
| JP | 2000330593 | A | 11/2000 |
| JP | 2000357000 | A | 12/2000 |
| JP | 2002118517 | A | 4/2002 |
| JP | 2003501925 | A | 1/2003 |
| JP | 2003506764 | A | 2/2003 |
| JP | 2003195881 | A | 7/2003 |
| JP | 2004514182 | A | 5/2004 |
| JP | 2006504123 | A | 2/2006 |
| JP | 2007065636 | A | 3/2007 |
| JP | 2007523388 | A | 8/2007 |
| JP | 2007525707 | A | 9/2007 |
| JP | 2007525707 | A | 9/2007 |
| JP | 2007538282 | A | 12/2007 |
| JP | 2007538282 | A | 12/2007 |
| JP | 2008015281 | A | 1/2008 |
| JP | 2008261904 | A | 10/2008 |
| JP | 2009508146 | A | 2/2009 |
| JP | 2009522588 | A | 6/2009 |
| JP | 2009527773 | A | 6/2009 |
| JP | 2010538314 | A | 12/2010 |
| JP | 2010539528 | A | 12/2010 |
| JP | 2011501511 | A | 1/2011 |
| JP | 2011527444 | A | 10/2011 |
| KR | 10-2004-0043278 | A | 5/2004 |
| KR | 1020070088276 | | 8/2007 |
| KR | 1020100059726 | | 6/2010 |
| RU | 2183034 | C2 | 5/2002 |
| RU | 2374703 | C2 | 10/2004 |
| RU | 2356046 | C2 | 10/2005 |
| TW | 380246 | B | 1/2000 |
| TW | 469423 | B | 12/2001 |
| TW | I253057 | B | 4/2006 |
| TW | 200703234 | A | 1/2007 |
| TW | 200729156 | A | 8/2007 |
| TW | 200830277 | A | 7/2008 |
| TW | 200841743 | A | 10/2008 |
| TW | I316225 | B | 10/2009 |
| TW | 200943279 | A | 10/2009 |
| TW | 200943792 | A | 10/2009 |
| TW | I320172 | B | 2/2010 |
| TW | 201009810 | A | 3/2010 |
| TW | 201009812 | | 3/2010 |
| TW | I324762 | B | 5/2010 |
| TW | 201027517 | A | 7/2010 |
| TW | 201030735 | A | 8/2010 |
| TW | 201032218 | A | 9/2010 |
| TW | 201040943 | A | 11/2010 |
| TW | 201103009 | A | 1/2011 |
| WO | 9222891 | A1 | 12/1992 |
| WO | WO-9510890 | A1 | 4/1995 |
| WO | WO-9629696 | A1 | 9/1996 |
| WO | WO-0075919 | A1 | 12/2000 |
| WO | WO-0165544 | A1 | 9/2001 |
| WO | WO-02101724 | A1 | 12/2002 |
| WO | WO-2002101722 | A1 | 12/2002 |
| WO | WO-2004027368 | A1 | 4/2004 |
| WO | 2005078706 | A1 | 8/2005 |
| WO | WO-2005078706 | A1 | 8/2005 |
| WO | WO-2005081231 | A1 | 9/2005 |
| WO | 2005112003 | A1 | 11/2005 |
| WO | WO-2005112003 | A1 | 11/2005 |
| WO | WO-2006126844 | A2 | 11/2006 |
| WO | 2006137425 | A1 | 12/2006 |
| WO | WO-2006130226 | A2 | 12/2006 |
| WO | WO-2007051548 | A1 | 5/2007 |
| WO | WO-2007073604 | A1 | 7/2007 |
| WO | WO-2007083931 | A1 | 7/2007 |
| WO | WO-2007096552 | A2 | 8/2007 |
| WO | WO-2008013788 | A2 | 1/2008 |
| WO | WO-2009029032 | A2 | 3/2009 |
| WO | WO-2009077321 | A2 | 6/2009 |
| WO | 2009121499 | A1 | 10/2009 |
| WO | 2010006717 | A1 | 1/2010 |
| WO | WO-2010003491 | A1 | 1/2010 |
| WO | WO-2010003532 | A1 | 1/2010 |
| WO | WO-2010003563 | A1 | 1/2010 |
| WO | WO-2010003663 | A1 | 1/2010 |
| WO | WO-2010040522 | A2 | 4/2010 |
| WO | WO-2010059374 | A1 | 5/2010 |
| WO | WO-2010093224 | A2 | 8/2010 |
| WO | WO-2011006369 | A1 | 1/2011 |
| WO | WO-2011048094 | A1 | 4/2011 |
| WO | WO-2011147950 | A1 | 12/2011 |
| WO | WO-2012110480 | A1 | 8/2012 |

OTHER PUBLICATIONS

Bessette et al.; "Universal Speech/Audio Coding Using Hybrid ACELP/TCX Techniques," *IEEE International Conference on Acoustics, Speech, and Signal Processing*, Philadelphia, Pennsylvania, Mar. 18-23, 2005; 3:301-304.

Office Action and Search Report in co-pending Taiwan Patent Application No. 101104674 dated Apr. 3, 2014, 8 pages.

Office Action and Search Report in co-pending Taiwan Patent Application No. 101104678 dated Apr. 3, 2014, 8 pages.

3GPP; "3rd Generation Partnership Project; Technical Specification Group Service and System Aspects; Audio codec processing functions; Extended AMR Wideband codec; Transcoding functions (Release 6)," *3GPP TS 26.290*, Sep. 2004; vol. 2.0.0.

Ashley et al.; "Wideband Coding of Speech Using a Scalable Pulse Codebook," Proc. *IEEE Workshop on Speech Coding*, Sep. 17, 2000; pp. 148-150.

ETSI; "Digital cellular telecommunications system (Phase 2+); Universal Mobile Telecommunications System (UMTS); LTE; Speech codec speech processing functions; Adaptive Multi-Rate—Wideband (AMR-WB) speech codec; Transcoding functions (3GPP TS 26.190 version 9.0.0 Release 9," *ETSI TS 126 190 V9.0.0*, Jan. 2010.

Ferreira, Anibal J.S.; "Combined Spectral Envelope Normalization and Subtraction of Sinusoidal Components in the ODFT and MDCT Frequency Domains," *IEEE Workshop on Applications of Signal Processing to Audio Acoustics*, 2010; pp. 51-54.

Fischer et al.; "Enumeration Encoding and Decoding Algorithms for Pyramid Cubic Lattice and Trellis Codes," *IEEE Transaction on Information Theory*, Nov. 1995; 41(6):2056-2061.

Hermansky, Hynek; "Perceptual linear predictive (PLP) analysis of speech," *J. Acoust. Soc. Amer.*, Apr. 1990; 87(4):1738-1751.

Hofbauer, Konrad; "Estimating Frequency and Amplitude of Sinusoid in Harmonic Signals—A Survey and the Use of Shifted Fourier Transforms"; *Graz University of Technology, Graz University of Music and Dramatic Arts*; Apr. 2004.

*IEEE Signal Processing Letters* Table of Contents, 2008; 15:967-975.

Joint Technical Committee ISO/IEC JTC 1; "Information technology—MPEG audio technologies—Part 3: Unified speech and audio coding," *ISO/IEC DIS 23003-3*, Jan. 31, 2011.

Lanciani et al.; "Subband-Domain Filtering of MPEG Audio Signals," *Proc. IEEE ICASSP*, Phoenix, Arizona, Mar. 1999; pp. 917-920.

Lauber et al.; "Error Concealment for Compressed Digital Audio," *Audio Engineering Society 111th Convention Paper 5460*, Sep. 21-24, 2001, New York City, New York.

Lee et al.; "A voice activity detection algorithm for communication systems with dynamically varying background acoustic noise," *Proc. Vehicular Technology Conference*, May 1998; vol. 2; pp. 1214-1218.

Motlicek et al.; "Audio Coding Based on Long Temporal Contexts," URL:http://www.idiap.ch/publications/motlicek-idiap-rr-06-30.bib.abs.html; *IDIAP-RR*, Apr. 2006.

Neuendorf et al.; "Completion of Core Experiment on Unification of USAC Windowing and Frame Transitions," *ISO/IEC JTC1/SC29/WG11, MPEG2010/M17167*, Jan. 2010, Kyoto, Japan.

Neuendorf, Max (editor); "WD7 of USAC," *ISO/IEC JTC1/SC29/WG11, MPEG2010/N11299*, Apr. 2010, Dresden, Germany.

(56) References Cited

OTHER PUBLICATIONS

Patwardhan et al.; "Effect of voice quality on frequency-warped modeling of vowel spectra," *Speech Communication*, 2006; 48(8):1009-1023.
Ryan et al.; "Reflected Simplex Codebooks for Limited Feedback MIMO Beamforming," *Proc. IEEE ICC*, 2009.
Terriberry et al.; "A Multiply-Free Enumeration of Combinations With Replacement and Sign," *IEEE Signal Processing Letters*, 2008; vol. 15.
Virette et al.; "Enhanced Pulse Indexing CE for ACELP in USAC," *International Organization for Standardization, ISO/IEC JTC1/ SC29/WG11, Coding of Moving Pictures and Audio*, Jan. 2011; MPEG2010/M19305, Daegu, Korea.
Wang et al.; "Frequency domain adaptive postfiltering for enhancement of noisy speech," *Speech Communication*, Mar. 1993; 12(1):41-56.
Waterschoot et al.; "Comparison of Linear Prediction Models for Audio Signals," *EURASIP Journal on Audio, Speech, and Music Processing*, Dec. 2008; Article ID 706935, 24 pages.
3GPP, "Audio codec processing functions; Extended Adaptive Multi-Rate—Wideband (AMR-WB+) codec; Transcoding functions," 2009, 3GPP TS 26.290.
Bessette et al.; "A wideband speech and audio codec at 16/24/32 kbit/s using hybrid ACELP/TCX techniques," Speech Coding Proceedings, 1999 IEEE Workshop in Porvoo, Finland, Jun. 20-23, 1999, and Piscataway, NJ, Jun. 20, 1999.
Bessette et al.; "The Adaptive Multirate Wideband Speech Codec (AMR-WB)," *IEEE Transactions on Speech and Audio Processing*, Nov. 1, 2002; 10(8).
Makinen et al.; "AMR-WB+: a New Audio Coding Standard for 3rd Generation Mobile Audio Services," 2005 *IEEE International Conference on Acoustics, Speech, and Signal Processing*, Mar. 2005; 2:1109-1112.
Martin, Rainer; "Noise Power Spectral Density Estimation Based on Optimal Smoothing and Minimum Statistics," *IEEE Transactions on Speech and Audio Processing*, Jul. 2001; 9(5):504-512.
Neuendorf et al.; "A Novel Scheme for Low Bitrate Unified Speech and Audio Coding—MPEG RMO," *AES Convention 126*, May 2009, New York City, New York.
Neuendorf et al.; "Unified speech and audio coding scheme for high quality at low bitrates," *Acoustics, Speech and Signal Processing*, 2009. IEEE International Conference on ICASSP, Piscataway, NJ, Apr. 19, 2009; pp. 1-4.
Sjoberg et al.; "RTP Payload Format for the Extended Adaptive Multi-Rate Wideband (AMR-WB+) Audio Codec; rfc4352.txt," Jan. 1, 2006.
USAC codec (Unified Speech and Audio Codec), ISO/IEC CD 23003-3 dated Sep. 24, 2010.
Zernicki et al.; "Report on CE on Improved Tonal Component Coding in eSBR," 95. MPEG Meeting Jan. 24, 2011-Jan. 28, 2011; DAEGU (Motion Picture Expert Group or ISO/IEC JTC1/SC29/ WG11); No. m19238; Jan. 20, 2011.
International Telecommunication Union; "Annex B: A silence compression scheme for G.729 optimized for terminals conforming to Recommendation V.70," *ITU-T Recommendation G.729—Annex B*; Series G: Transmission Systems and Media, Nov. 1996.
Notification of Reason for Rejection in co-pending Japan Patent Application No. 2013-553881 dated Aug. 20, 2014, 3 pages.
Notification of Reason for Rejection in co-pending Japan Patent Application No. 2013-553903 dated Jul. 2, 2014, 5 pages.
Notification of Reasons for Rejection in co-pending Japan Patent Application No. 2013-553902 dated Oct. 7, 2014, 7 pages.
Office Action and Search Report in co-pending Chinese Patent Application No. 2012800159977 dated Sep. 19, 2014, 7 pages.
Office Action and Search Report in co-pending Chinese Patent Application No. 2012800164424 dated Sep. 28, 2014, 6 pages.
Office Action and Search Report in co-pending Chinese Patent Application No. 2012800182653 dated Sep. 1, 2014, 7 pages.
Office Action and Search Report in co-pending Taiwan Patent Application No. 101104682 dated May 7, 2014, 10 pages.
Martin, Rainer; "Spectral Subtraction Based on Minimum Statistics," *Proc. EUSIPCO 94*, pp. 1182-1185, 1994.
Notification of Reasons for Refusal in co-pending Japan Patent Application No. 2013-553882 dated Aug. 13, 2014, 4 pages.
Notification of Reasons for Refusal in co-pending Japan Patent Application No. 2013-553892 dated Aug. 28, 2014, 7 pages.
Notification of Reasons for Refusal in co-pending Japan Patent Application No. 2013-553904 dated Sep. 24, 2014, 5 pages.
U.S. Appl. No. 13/966,048 Final Office Action dated Nov. 4, 2014, 10 pages.
Decision to Grant in co-pending Russian Patent Application No. 2013141935 dated Nov. 24, 2014, 7 pages.
Notice of Allowance in co-pending U.S. Appl. No. 13/966,666 dated Dec. 22, 2014, 35 pages.
Office Action and Search Report in co-pending Chinese Patent Application No. 201280014994.1 dated Oct. 10, 2014, 14 pages.
Office Action and Search Report in co-pending Chinese Patent Application No. 201280015995.8 dated Nov. 2, 2014, 7 pages.
Office Action and Search Report in co-pending Chinese Patent Application No. 201280018224.4 dated Nov. 2, 2014, 8 pages.
Office Action and Search Report in co-pending Chinese Patent Application No. 2012800182511 dated Jan. 8, 2015, 8 pages.
Office Action and Search Report in co-pending Chinese Patent Application No. 2012800182827 dated Oct. 20, 2014, 23 pages.
Office Action and Search Report in co-pending Chinese Patent Application No. 2012800184818 dated Dec. 8, 2014, 9 pages.
Terriberry, Timothy B.; "Pulse Vector Coding," retrieved from the Internet Feb. 11, 2015; http://people.xiph.org/~tterribe/notes/cwrs.html.
Office Action in co-pending Korean Patent Application No. 10-2013-7024213 dated Mar. 12, 2015, 6 pages.
Office action in co-pending U.S. Appl. No. 13/672,935, dated Apr. 16, 2015.
Office action dated Apr. 13, 2015 in co-pending KR Patent Application No. 10-2013-7024070.
Office action dated Apr. 13, 2015 in co-pending KR Patent Application No. 10-2013-7024347.
Office action dated Jun. 5, 2015 in co-pending U.S. Appl. No. 13/966,635.
"A Silence Compression Scheme for G.729 Optimized for Terminals Conforming to Recommendation V,70," ITU-T Recommendation G.729—Annex B, International Teiecommunication Union, Nov. 1996.
Makinen, J. et al., "AMR-WB+: a New Audio Coding Standard for 3rd Generation Mobile Audio Services," 2005 IEEE International Conference on Acoustics, Speech, and Signal Processing; Philadelphia, PA; USA, Mar. 18, 2005.
Sjoberg, J. et al., "RTP Payload Format for the Extended Adaptive Multi-Rate Wideband (AMR-WB+) Audio Codec," Memo, The Internet Society, Network Working Group, Cataegory: Standards Track, Jan. 2006.
Zernicki, T. et al., "Report on Ce on improved Tonal Component Coding in eSBR." International Organisation for Standardisation Organisation Internationale De Normalisation ISO/IEC JTC1/SC29/ WG11, Coding of Moving Pictures and Audio, Daegu, S. Korea, Jan. 2011.
Office action dated Jun. 9, 2015 in co-pending JP Patent Appl. No. 2014-158475.
Decision to Grant dated Mar. 31, 2015 in co-pending RU Patent Appl. No. 2013-142138.
3GPP2, "3rd Generation Partnership Project 2, Enhanced Variable Rate Codec, Speech Service Options 3, 68, 70 and 73 for Wideband Spread Spectrum Digital Systems," 3GPP2 C.S0014-D, Version 1, May 2009.

* cited by examiner

AUDIO CODEC USING NOISE SYNTHESIS DURING INACTIVE PHASES

CROSS-REFERENCE TO RELATED APPLICATIONS

This application is a continuation of copending International Application No. PCT/EP2012/052462, filed Feb. 14, 2012, which is incorporated herein by reference in its entirety, and additionally claims priority from U.S. Provisional Application No. 61/442,632, filed Feb. 14, 2011, which is also incorporated herein by reference in its entirety.

BACKGROUND OF THE INVENTION

The present invention is concerned with an audio codec supporting noise synthesis during inactive phases.

The possibility of reducing the transmission bandwidth by taking advantage of inactive periods of speech or other noise sources are known in the art. Such schemes generally use some form of detection to distinguish between inactive (or silence) and active (non-silence) phases. During inactive phases, a lower bitrate is achieved by stopping the transmission of the ordinary data stream precisely encoding the recorded signal, and only sending silence insertion description (SID) updates instead. SID updates may be transmitted in a regular interval or when changes in the background noise characteristics are detected. The SID frames may then be used at the decoding side to generate a background noise with characteristics similar to the background noise during the active phases so that the stopping of the transmission of the ordinary data stream encoding the recorded signal does not lead to an unpleasant transition from the active phase to the inactive phase at the recipient's side.

However, there is still a need for further reducing the transmission rate. An increasing number of bitrate consumers, such as an increasing number of mobile phones, and an increasing number of more or less bitrate intensive applications, such as wireless transmission broadcast, necessitate a steady reduction of the consumed bitrate.

On the other hand, the synthesized noise should closely emulate the real noise so that the synthesis is transparent for the users.

Accordingly, it is one objective of the present invention to provide an audio codec scheme supporting noise generation during inactive phases which enables reducing the transmission bitrate with maintaining the achievable noise generation quality.

SUMMARY

According to an embodiment, an audio encoder may have: a background noise estimator configured to continuously update a parametric background noise estimate during an active phase based on an input audio signal; an encoder for encoding the input audio signal into a data stream during the active phase; and a detector configured to detect an entrance of an inactive phase following the active phase based on the input audio signal, wherein the audio encoder is configured to, upon detection of the entrance of the inactive phase, encode into the data stream the parametric background noise estimate as continuously updated during the active phase which the inactive phase detected follows. According to another embodiment, an audio decoder for decoding a data stream so as to reconstruct therefrom an audio signal, the data stream having at least an active phase followed by an inactive phase may have: a background noise estimator configured to continuously update a parametric background noise estimate from the data stream during the active phase; a decoder configured to reconstruct the audio signal from the data stream during the active phase; a parametric random generator; a background noise generator configured to synthesize the audio signal during the inactive phase by controlling the parametric random generator during the inactive phase depending on the parametric background noise estimate; wherein the decoder is configured to, in reconstructing the audio signal from the data stream, shape an excitation signal transform coded into the data stream, according to linear prediction coefficients also coded into the data stream; and wherein the background noise estimator is configured to update the parametric background noise estimate using the excitation signal.

According to another embodiment, an audio encoding method may have the steps of: continuously updating a parametric background noise estimate during an active phase based on an input audio signal; encoding the input audio signal into a data stream during the active phase; detecting an entrance of an inactive phase following the active phase based on the input audio signal; and upon detection of the entrance of the inactive phase, encoding into the data stream the parametric background noise estimate as continuously updated during the active phase which the inactive phase detected follows.

According to still another embodiment, an audio decoding method for decoding a data stream so as to reconstruct therefrom an audio signal, the data stream having at least an active phase followed by an inactive phase, my have the steps of: continuously updating a parametric background noise estimate from the data stream during the active phase; reconstructing the audio signal from the data stream during the active phase; synthesizing the audio signal during the inactive phase by controlling a parametric random generator during the inactive phase depending on the parametric background noise estimate; wherein the reconstruction of the audio signal from the data stream has shaping an excitation signal transform coded into the data stream, according to linear prediction coefficients also coded into the data stream, and wherein the continuous update of the parametric background noise estimate is performed using the excitation signal. Another embodiment may have a computer program having a program code for performing, when running on a computer, the above audio encoding method or the above audio decoding method.

The basic idea of the present invention is that valuable bitrate may be saved with maintaining the noise generation quality within inactive phases, if a parametric background noise estimate is continuously updated during an active phase so that the noise generation may immediately be started with upon the entrance of an inactive phase following the active phase. For example, the continuous update may be performed at the decoding side, and there is no need to preliminarily provide the decoding side with a coded representation of the background noise during a warm-up phase immediately following the detection of the inactive phase which provision would consume valuable bitrate, since the decoding side has continuously updated the parametric background noise estimate during the active phase and is, thus, prepared at any time to immediately enter the inactive phase with an appropriate noise generation. Likewise, such a warm-up phase may be avoided if the parametric background noise estimate is done at the encoding side. Instead of preliminarily continuing with providing the decoding side with a conventionally coded representation of the background noise upon detecting the entrance of the inactive phase in order to learn the background noise and inform the decoding side after the learning phase accordingly, the encoder is able to provide the decoder with the necessitated parametric background noise estimate immediately upon detecting the entrance of the inactive phase by falling back on the parametric background noise estimate continuously updated during the past active phase thereby avoiding the bitrate consuming preliminary further prosecution of supererogatorily encoding the background noise.

In accordance with specific embodiments of the present invention, a more realistic noise generation at moderate overhead in terms of, for example, bitrate and computational complexity is achieved. In particular, in accordance with these embodiments, the spectral domain is used in order to parameterize the background noise thereby yielding a background noise synthesis which is more realistic and thus leads to a more transparent active to inactive phase switching. Moreover, it has been found out that parameterizing the background noise in the spectral domain enables separating noise from the useful signal and accordingly, parameterizing the background noise in the spectral domain has an advantage when combined with the aforementioned continuous update of the parametric background noise estimate during the active phases as a better separation between noise and useful signal may be achieved in the spectral domain so that no additional transition from one domain to the other is necessary when combining both advantageous aspects of the present application.

BRIEF DESCRIPTION OF THE DRAWINGS

Embodiments of the present application are described below with respect to the Figures among which.

DETAILED DESCRIPTION OF THE INVENTION

Figure 1:
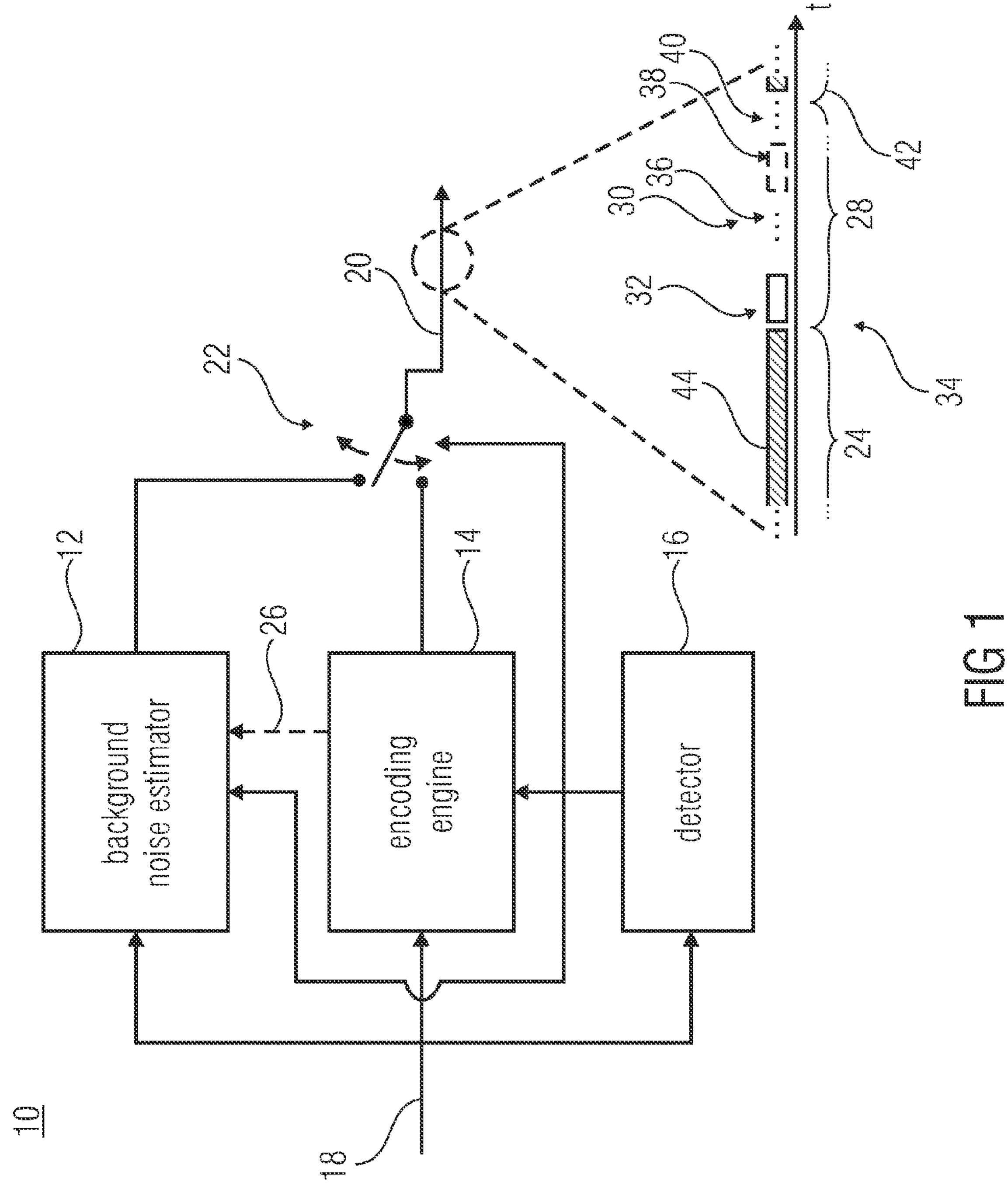
FIG. 1 shows a block diagram showing an audio encoder according to an embodiment.

FIG. 1 shows an audio encoder according to an embodiment of the present invention. The audio encoder of FIG. 1 comprises a background noise estimator 12, an encoding engine 14, a detector 16, an audio signal input 18 and a data stream output 20. Provider 12, encoding engine 14 and detector 16 have an input connected to audio signal input 18, respectively. Outputs of estimator 12 and encoding engine 14 are respectively connected to data stream output 20 via a switch 22. Switch 22, estimator 12 and encoding engine 14 have a control input connected to an output of detector 16, respectively.

The background noise estimator 12 is configured to continuously update a parametric background noise estimate during an active phase 24 based on an input audio signal entering the audio encoder 10 at input 18. Although FIG. 1 suggests that the background noise estimator 12 may derive the continuous update of the parametric background noise estimate based on the audio signal as input at input 18, this is not necessarily the case. The background noise estimator 12 may alternatively or additionally obtain a version of the audio signal from encoding engine 14 as illustrated by dashed line 26. In that case, the background noise estimator 12 would alternatively or additionally be connected to input 18 indirectly via connection line 26 and encoding engine 14 respectively. In particular, different possibilities exist for background noise estimator 12 to continuously update the background noise estimate and some of these possibilities are described further below.

The encoding engine 14 is configured to encode the input audio signal arriving at input 18 into a data stream during the active phase 24. The active phase shall encompass all times where a useful information is contained within the audio signal such as speech or other useful sound of a noise source. On the other hand, sounds with an almost time-invariant characteristic such as a time-invariance spectrum as caused, for example, by rain or traffic in the background of a speaker, shall be classified as background noise and whenever merely this background noise is present, the respective time period shall be classified as an inactive phase 28. The detector 16 is responsible for detecting the entrance of an inactive phase 28 following the active phase 24 based on the input audio signal at input 18. In other words, the detector 16 distinguishes between two phases, namely active phase and inactive phase wherein the detector 16 decides as to which phase is currently present. The detector 16 informs encoding engine 14 about the currently present phase and as already mentioned, encoding engine 14 performs the encoding of the input audio signal into the data stream during the active phases 24. Detector 16 controls switch 22 accordingly so that the data stream output by encoding engine 14 is output at output 20. During inactive phases, the encoding engine 14 may stop encoding the input audio signal. At least, the data stream outputted at output 20 is no longer fed by any data stream possibly output by the encoding engine 14. In addition to that, the encoding engine 14 may only perform minimum processing to support the estimator 12 with some state variable updates. This action will greatly reduce the computational power. Switch 22 is, for example, set such that the output of estimator 12 is connected to output 20 instead of the encoding engine's output. This way, valuable transmission bitrate for transmitting the bitstream output at output 20 is reduced.

The background noise estimator 12 is configured to continuously update a parametric background noise estimate during the active phase 24 based on the input audio signal 18 as already mentioned above, and due to this, estimator 12 is able to insert into the data stream 30 output at output 20 the parametric background noise estimate as continuously updated during the active phase 24 immediately following the transition from the active phase 24 to the inactive phase 28, i.e. immediately upon the entrance into the inactive phase 28. Background noise estimator 12 may, for example, insert a silence insertion descriptor frame 32 into the data stream 30 immediately following the end of the active phase 24 and immediately following the time instant 34 at which the detector 16 detected the entrance of the inactive phase 28. In other words, there is no time gap between the detectors detection of the entrance of the inactive phase 28 and the insertion of the SID 32 necessary due to the background noise estimator's continuous update of the parametric background noise estimate during the active phase 24.

Thus, summarizing the above description the audio encoder 10 of FIG. 1 may operate as follows. Imagine, for illustration purposes, that an active phase 24 is currently present. In this case, the encoding engine 14 currently encodes the input audio signal at input 18 into the data stream 20. Switch 22 connects the output of encoding engine 14 to the output 20. Encoding engine 14 may use parametric coding and/transform coding in order to encode the input audio signal 18 into the data stream. In particular, encoding engine 14 may encode the input audio signal in units of frames with each frame encoding one of consecutive—partially mutually overlapping—time intervals of the input audio signal. Encoding engine 14 may additionally have the ability to switch between different coding modes between the consecutive frames of the data stream. For example, some frames may be encoded using predictive coding such as CELP coding, and some other frames may be coded using transform coding such as TCX or AAC coding. Reference is made, for example, to USAC and its coding modes as described in ISO/IEC CD 23003-3 dated Sep. 24, 2010.

The background noise estimator 12 continuously updates the parametric background noise estimate during the active phase 24. Accordingly, the background noise estimator 12 may be configured to distinguish between a noise component and a useful signal component within the input audio signal in order to determine the parametric background noise estimate merely from the noise component. According to the embodiments further described below, the background noise estimator 12 may perform this updating in a spectral domain such as a spectral domain also used for transform coding within encoding engine 14. However, other alternatives are also available, such as the time-domain. If the spectral domain, same may be a lapped transform domain such as an MDCT domain, or a filterbank domain such as a complex valued filterbank domain such as an QMF domain.

Moreover, the background noise estimator 12 may perform the updating based on an excitation or residual signal obtained as an intermediate result within encoding engine 14 during, for example, predictive and/or transform coding rather than the audio signal as entering input 18 or as lossy coded into the data stream. By doing so, a large amount of the useful signal component within the input audio signal would already have been removed so that the detection of the noise component is easier for the background noise estimator 12.

During the active phase 24, detector 16 is also continuously running to detect an entrance of the inactive phase 28. The detector 16 may be embodied as a voice/sound activity detector (VAD/SAD) or some other means which decides whether a useful signal component is currently present within the input audio signal or not. A base criterion for detector 16 in order to decide whether an active phase 24 continues could be checking whether a low-pass filtered power of the input audio signal remains below a certain threshold, assuming that an inactive phase is entered as soon as the threshold is exceeded.

Independent from the exact way the detector 16 performs the detection of the entrance of the inactive phase 28 following the active phase 24, the detector 16 immediately informs the other entities 12, 14 and 22 of the entrance of the inactive phase 28. Due to the background noise estimator's continuous update of the parametric background noise estimate during the active phase 24, the data stream 30 output at output 20 may be immediately prevented from being further fed from encoding engine 14. Rather, the background noise estimator 12 would, immediately upon being informed of the entrance of the inactive phase 28, insert into the data stream 30 the information on the last update of the parametric background noise estimate in the form of the SID frame 32. That is, SID frame 32 could immediately follow the last frame of encoding engine which encodes the frame of the audio signal concerning the time interval within which the detector 16 detected the inactive phase entrance.

Normally, the background noise does not change very often. In most cases, the background noise tends to be something invariant in time. Accordingly, after the background noise estimator 12 inserted SID frame 32 immediately after the detector 16 detecting the beginning of the inactive phase 28, any data stream transmission may be interrupted so that in this interruption phase 34, the data stream 30 does not consume any bitrate or merely a minimum bitrate necessitated for some transmission purposes. In order to maintain a minimum bitrate, background noise estimator 12 may intermittently repeat the output of SID 32.

However, despite the tendency of background noise to not change in time, it nevertheless may happen that the background noise changes. For example, imagine a mobile phone user leaving the car so that the background noise changes from motor noise to traffic noise outside the car during the user phoning. In order to track such changes of the background noise, the background noise estimator 12 may be configured to continuously survey the background noise even during the inactive phase 28. Whenever the background noise estimator 12 determines that the parametric background noise estimate changes by an amount which exceeds some threshold, background estimator 12 may insert an updated version of parametric background noise estimate into the data stream 20 via another SID 38, whereinafter another interruption phase 40 may follow until, for example, another active phase 42 starts as detected by detector 16 and so forth. Naturally, SID frames revealing the currently updated parametric background noise estimate may alternatively or additionally interspersed within the inactive phases in an intermediate manner independent from changes in the parametric background noise estimate.

Obviously, the data stream 44 output by encoding engine 14 and indicated in FIG. 1 by use of hatching, consumes more transmission bitrate than the data stream fragments 32 and 38 to be transmitted during the inactive phases 28 and accordingly the bitrate savings are considerable. Moreover, since the background noise estimator 12 is able to immediately start with proceeding to further feed the data stream 30, it is not necessary to preliminarily continue transmitting the data stream 44 of encoding engine 14 beyond the inactive phase detection point in time 34, thereby further reducing the overall consumed bitrate.

Figure 2:
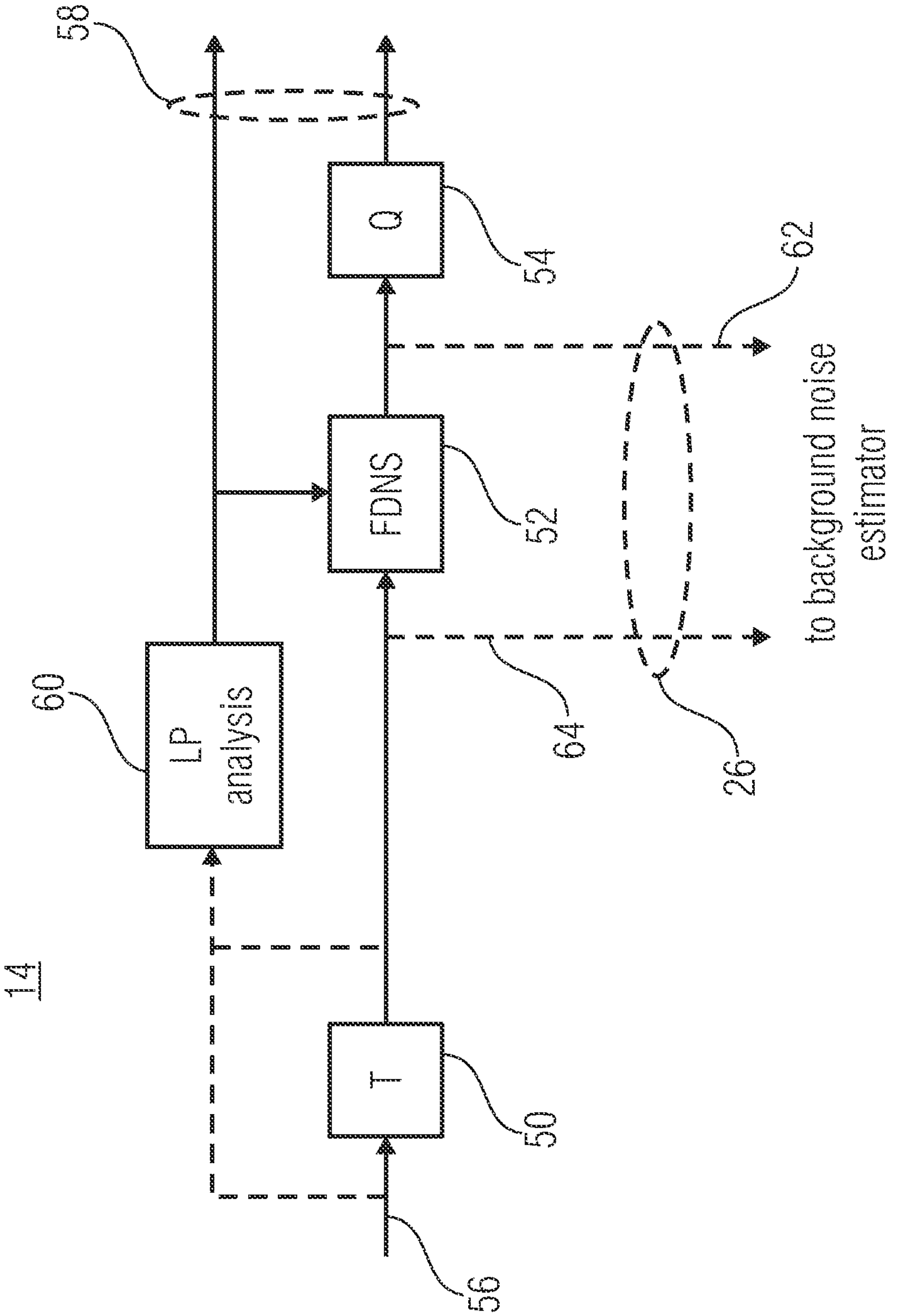
FIG. 2 shows a possible implementation of the encoding engine 14.

As will be explained in more detail below with regard to more specific embodiments, the encoding engine 14 may be configured to, in encoding the input audio signal, predictively code the input audio signal into linear prediction coefficients and an excitation signal with transform coding the excitation signal and coding the linear prediction coefficients into the data stream 30 and 44, respectively. One possible implementation is shown in FIG. 2. According to FIG. 2, the encoding engine 14 comprises a transformer 50, a frequency domain noise shaper 52 and a quantizer 54 which are serially connected in the order of their mentioning between an audio signal input 56 and a data stream output 58 of encoding engine 14. Further, the encoding engine 14 of FIG. 2 comprises a linear prediction analysis module 60 which is configured to determine linear prediction coefficients from the audio signal 56 by respective analysis windowing of portions of the audio signal and applying an autocorrelation on the windowed portions, or determine an autocorrelation on the basis of the transforms in the transform domain of the input audio signal as output by transformer 50 with using the power spectrum thereof and applying an inverse DFT onto so as to determine the autocorrelation, with subsequently performing LPC estimation based on the autocorrelation such as using a (Wiener-) Levinson-Durbin algorithm.

Based on the linear prediction coefficients determined by the linear prediction analysis module 60, the data stream output at output 58 is fed with respective information on the LPCs, and the frequency domain noise shaper is controlled so as to spectrally shape the audio signal's spectrogram in accordance with a transfer function corresponding to the transfer function of a linear prediction analysis filter determined by the linear prediction coefficients output by module 60. A quantization of the LPCs for transmitting them in the data stream may be performed in the LSP/LSF domain and using interpolation so as to reduce the transmission rate compared to the analysis rate in the analyzer 60. Further, the LPC to spectral weighting conversion performed in the FDNS may involve applying a ODFT onto the LPCs and appliying the resulting weighting values onto the transformer's spectra as divisor.

Quantizer 54 then quantizes the transform coefficients of the spectrally formed (flattened) spectrogram. For example, the transformer 50 uses a lapped transform such as an MDCT in order to transfer the audio signal from time domain to spectral domain, thereby obtaining consecutive transforms corresponding to overlapping windowed portions of the input audio signal which are then spectrally formed by the frequency domain noise shaper 52 by weighting these transforms in accordance with the LP analysis filter's transfer function.

The shaped spectrogram may be interpreted as an excitation signal and as it is illustrated by dashed arrow 62, the background noise estimator 12 may be configured to update the parametric background noise estimate using this excitation signal. Alternatively, as indicated by dashed arrow 64, the background noise estimator 12 may use the lapped transform representation as output by transformer 50 as a basis for the update directly, i.e. without the frequency domain noise shaping by noise shaper 52.

Further details regarding possible implementation of the elements shown in FIGS. 1 to 2 are derivable from the subsequently more detailed embodiments and it is noted that all of these details are individually transferable to the elements of FIGS. 1 and 2.

Figure 3:
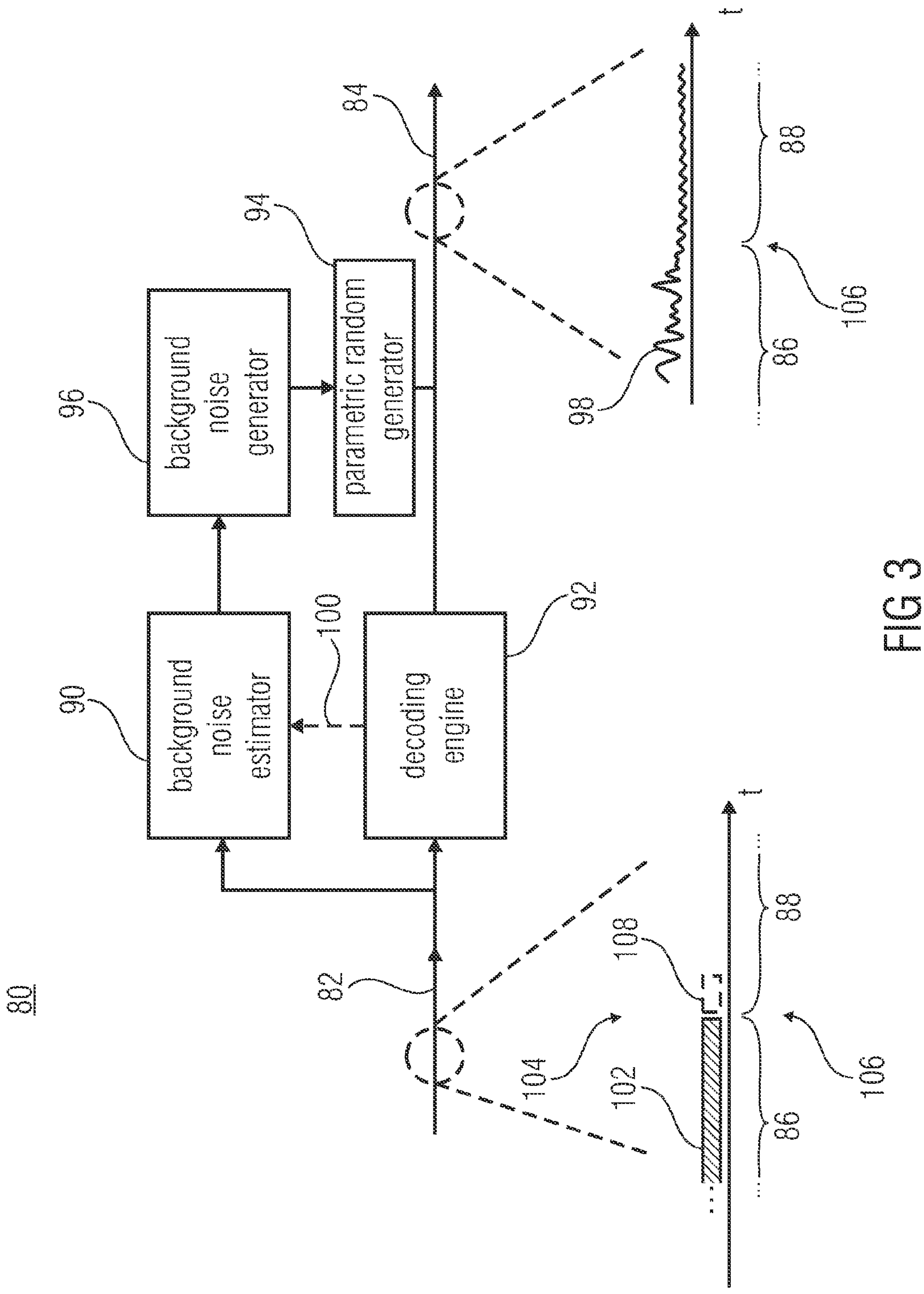
FIG. 3 shows a block diagram of an audio decoder according to an embodiment.

Before, however, describing these more detailed embodiments, reference is made to FIG. 3, which shows that additionally or alternatively, the parametric background noise estimate update may be performed at the decoder side.

The audio decoder 80 of FIG. 3 is configured to decode a data stream entering at an input 82 of decoder 80 so as to reconstruct therefrom an audio signal to be output at an output 84 of decoder 80. The data stream comprises at least an active phase 86 followed by an inactive phase 88. Internally, the audio decoder 80 comprises a background noise estimator 90, a decoding engine 92, a parametric random generator 94 and a background noise generator 96. Decoding engine 92 is connected between input 82 and output 84 and likewise, the serial connection of provider 90, background noise generator 96 and parametric random generator 94 are connected between input 82 and output 84. The decoder 92 is configured to reconstruct the audio signal from the data stream during the active phase, so that the audio signal 98 as output at output 84 comprises noise and useful sound in an appropriate quality. The background noise estimator 90 is configured to continuously update a parametric background noise estimate from the data stream during the active phase. To this end, the background noise estimator 90 may not be connected to input 82 directly but via the decoding engine 92 as illustrated by dashed line 100 so as to obtain from the decoding engine 92 some reconstructed version of the audio signal. In principle, the background noise estimator 90 may be configured to operate very similar to the background noise estimator 12, besides the fact that the background noise estimator 90 has merely access to the reconstructible version of the audio signal, i.e. including the loss caused by quantization at the encoding side.

The parametric random generator 94 may comprise one or more true or pseudo random number generators, the sequence of values output by which may conform to a statistical distribution which may be parametrically set via the background noise generator 96.

The background noise generator 96 is configured to synthesize the audio signal 98 during the inactive phase 88 by controlling the parametric random generator 94 during the inactive phase 88 depending on the parametric background noise estimate as obtained from the background noise estimator 90. Although both entities 96 and 94 are shown to be serially connected, the serial connection should not be interpreted as being limiting. The generators 96 and 94 could be interlinked. In fact, generator 94 could be interpreted to be part of generator 96.

Thus, the mode of operation of the audio decoder 80 of FIG. 3 may be as follows. During an active phase 86 input 82 is continuously provided with a data stream portion 102 which is to be processed by decoding engine 92 during the active phase 86. The data stream 104 entering at input 82 then stops the transmission of data stream portion 102 dedicated for decoding engine 92 at some time instant 106. That is, no further frame of data stream portion is available at time instant 106 for decoding by engine 92. The signalization of the entrance of the inactive phase 88 may either be the disruption of the transmission of the data stream portion 102, or may be signaled by some information 108 arranged immediately at the beginning of the inactive phase 88.

In any case, the entrance of the inactive phase 88 occurs very suddenly, but this is not a problem since the background noise estimator 90 has continuously updated the parametric background noise estimate during the active phase 86 on the basis of the data stream portion 102. Due to this, the background noise estimator 90 is able to provide the background noise generator 96 with the newest version of the parametric background noise estimate as soon as the inactive phase 88 starts at 106. Accordingly, from time instant 106 on, decoding engine 92 stops outputting any audio signal reconstruction as the decoding engine 92 is not further fed with a data stream portion 102, but the parametric random generator 94 is controlled by the background noise generator 96 in accordance with a parametric background noise estimate such that an emulation of the background noise may be output at output 84 immediately following time instant 106 so as to gaplessly follow the reconstructed audio signal as output by decoding engine 92 up to time instant 106. Cross-fading may be used to transit from the last reconstructed frame of the active phase as output by engine 92 to the background noise as determined by the recently updated version of the parametric background noise estimate.

As the background noise estimator 90 is configured to continuously update the parametric background noise estimate from the data stream 104 during the active phase 86, same may be configured to distinguish between a noise component and a useful signal component within the version of the audio signal as reconstructed from the data stream 104 in the active phase 86 and to determine the parametric background noise estimate merely from the noise component rather than the useful signal component. The way the background noise estimator 90 performs this distinguishing/separation corresponds to the way outlined above with respect to the background noise estimator 12. For example, the excitation or residual signal internally reconstructed from the data stream 104 within decoding engine 92 may be used.

Figure 4:
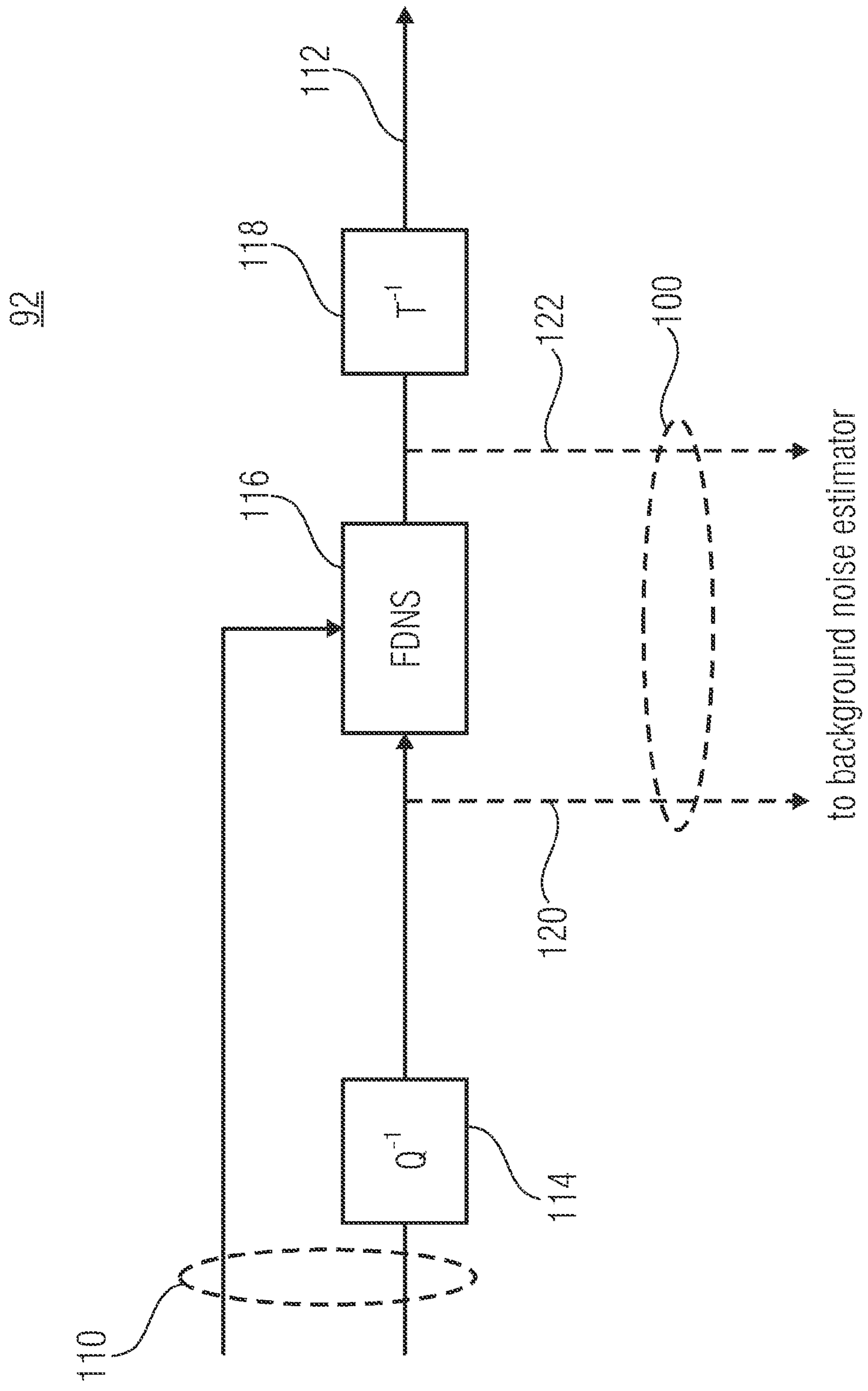
FIG. 4 shows a possible implementation of the decoding engine of FIG. 3 in accordance with an embodiment.

Similar to FIG. 2, FIG. 4 shows a possible implementation for the decoding engine 92. According to FIG. 4, the decoding engine 92 comprises an input 110 for receiving the data stream portion 102 and an output 112 for outputting the reconstructed audio signal within the active phase 86. Serially connected therebetween, the decoding engine 92 comprises a dequantizer 114, a frequency domain noise shaper 116 and an inverse transformer 118, which are connected between input 110 and output 112 in the order of their mentioning. The data stream portion 102 arriving at input 110 comprises a transform coded version of the excitation signal, i.e. transform coefficient levels representing the same, which are fed to the input of dequantizer 114, as well as information on linear prediction coefficients, which information is fed to the frequency domain noise shaper 116. The dequantizer 114 dequantizes the excitation signal's spectral representation and forwards same to the frequency domain noise shaper 116 which, in turn, spectrally forms the spectrogram of the excitation signal (along with the flat quantization noise) in accordance with a transfer function which corresponds to a linear prediction synthesis filter, thereby forming the quantization noise. In principle, FDNS 116 of FIG. 4 acts similar to FDNS of FIG. 2: LPCs are extracted from the data stream and then subject to LPC to spectral weight conversion by, for example, applying an ODFT onto the extracted LPCs with then applying the resulting spectral weightings onto the dequantized spectra inbound from dequantizer 114 as multiplicators. The retransformer 118 then transfers the thus obtained audio signal reconstruction from the spectral domain to the time domain and outputs the reconstructed audio signal thus obtained at output 112. A lapped transform may be used by the inverse transformer 118 such as by an IMDCT. As illustrated by dashed arrow 120, the excitation signal's spectrogram may be used by the background noise estimator 90 for the parametric background noise update. Alternatively, the spectrogram of the audio signal itself may be used as indicated by dashed arrow 122.

With regard to FIGS. 2 and 4 it should by noted that these embodiments for an implementation of the encoding/decoding engines are not to be interpreted as restrictive. Alternative embodiments are also feasible. Moreover, the encoding/decoding engines may be of a multi-mode codec type where the parts of FIGS. 2 and 4 merely assume responsibility for encoding/decoding frames having a specific frame coding mode associate therewith, whereas other frames are subject to other parts of the encoding/decoding engines not shown in FIGS. 2 and 4. Such another frame coding mode could also be a predictive coding mode using linear prediction coding for example, but with coding in the time-domain rather than using transform coding.

Figure 5:
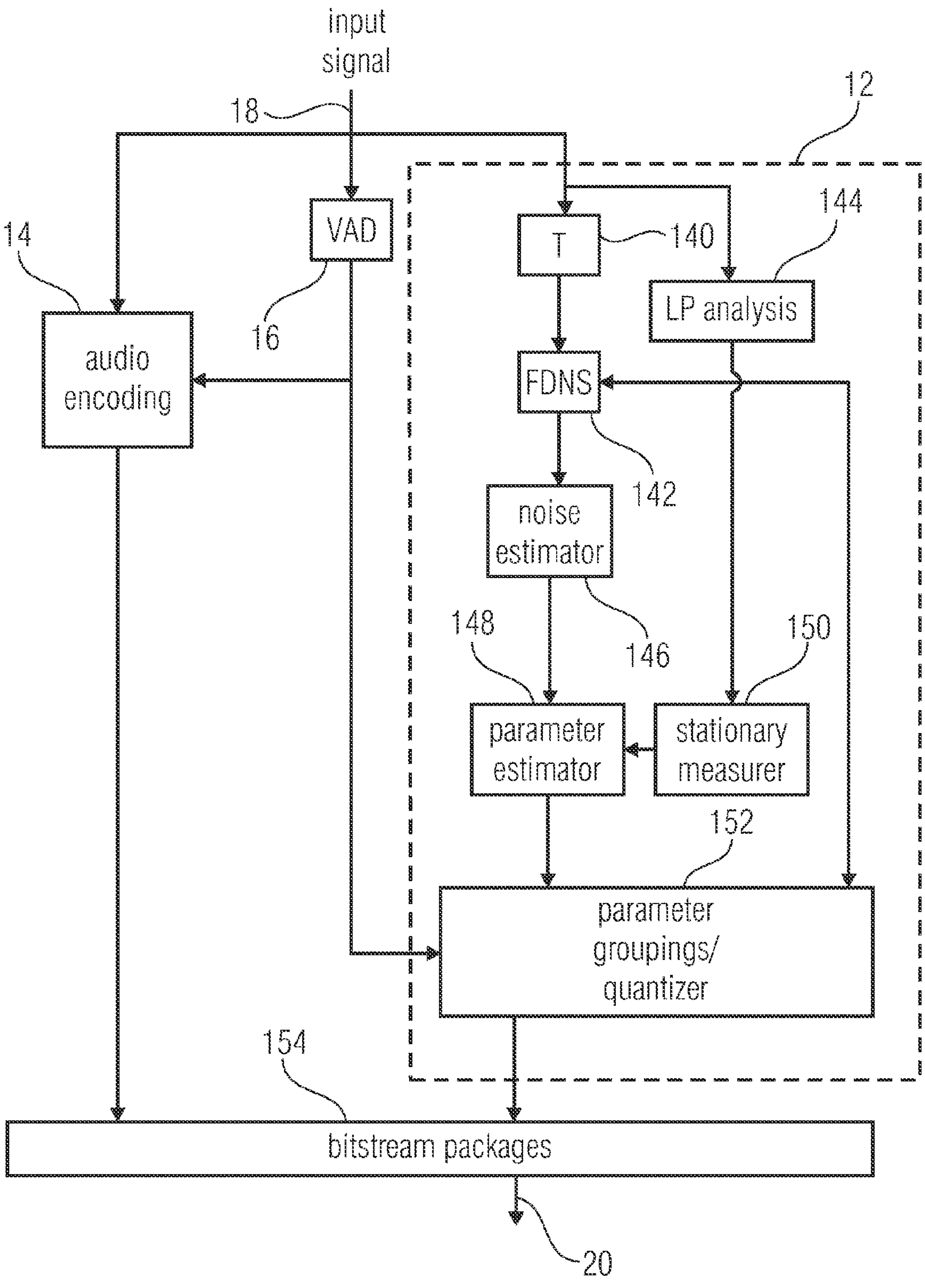
FIG. 5 shows a block diagram of an audio encoder according to a further, more detailed description of the embodiment.

FIG. 5 shows a more detailed embodiment of the encoder of FIG. 1. In particular, the background noise estimator 12 is shown in more detail in FIG. 5 in accordance with a specific embodiment.

In accordance with FIG. 5, the background noise estimator 12 comprises a transformer 140, an FDNS 142, an LP analysis module 144, a noise estimator 146, a parameter estimator 148, a stationarity measurer 150, and a quantizer 152. Some of the components just-mentioned may be partially or fully co-owned by encoding engine 14. For example, transformer 140 and transformer 50 of FIG. 2 may be the same, LP analysis modules 60 and 144 may be the same, FDNSs 52 and 142 may be the same and/or quantizers 54 and 152 may be implemented in one module.

FIG. 5 also shows a bitstream packager 154 which assumes a passive responsibility for the operation of switch 22 in FIG. 1. In particular, the VAD as the detector 16 of encoder of FIG. 5 is exemplarily called, simply decides as to which path should be taken, either the path of the audio encoding 14 or the path of the background noise estimator 12. To be more precise, encoding engine 14 and background noise estimator 12 are both connected in parallel between input 18 and packager 154, wherein within background noise estimator 12, transformer 140, FDNS 142, LP analysis module 144, noise estimator 146, parameter estimator 148, and quantizer 152 are serially connected between input 18 and packager 154 (in the order of their mentioning), while LP analysis module 144 is connected between input 18 and an LPC input of FDNS module 142 and a further input of quantizer 152, respectively, and stationarity measurer 150 is additionally connected between LP analysis module 144 and a control input of quantizer 152. The bitstream packager 154 simply performs the packaging if it receives an input from any of the entities connected to its inputs.

In the case of transmitting zero frames, i.e. during the interruption phase of the inactive phase, the detector 16 informs the background noise estimator 12, in particular the quantizer 152, to stop processing and to not send anything to the bitstream packager 154.

In accordance with FIG. 5, detector 16 may operate in the time and/or transform/spectral domain so as to detect active/inactive phases.

The mode of operation of the encoder of FIG. 5 is as follows. As will get clear, the encoder of FIG. 5 is able to improve the quality of comfort noise such as stationary noise in general, such as car noise, babble noise with many talkers, some musical instruments, and in particular those which are rich in harmonics such as rain drops.

Figure 6:
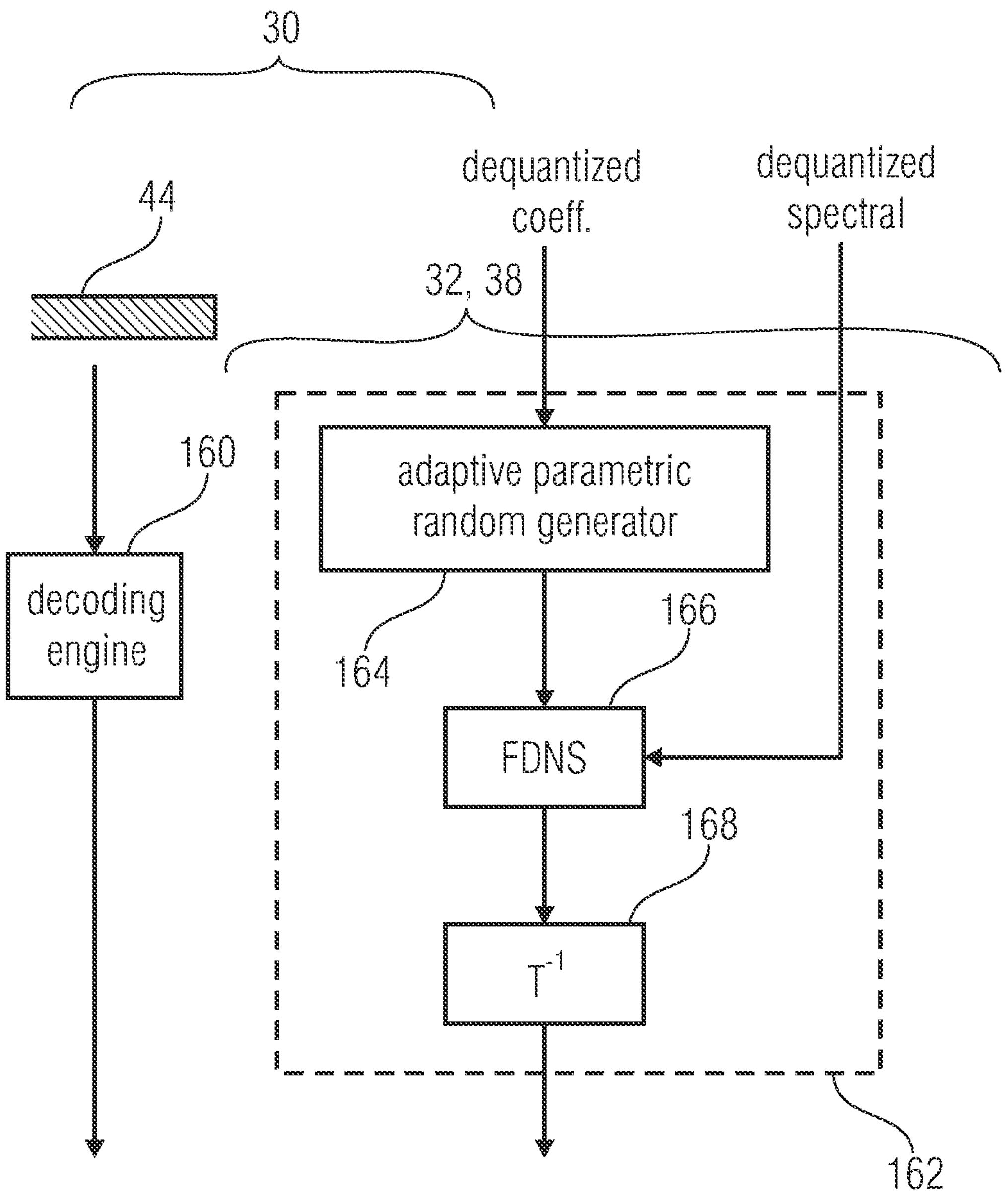
FIG. 6 shows a block diagram of a decoder which could be used in connection with the encoder of FIG. 5 in accordance with an embodiment.

In particular, the encoder of FIG. 5 is to control a random generator at the decoding side so as to excite transform coefficients such that the noise detected at the encoding side is emulated. Accordingly, before discussing the functionality of the encoder of FIG. 5 further, reference is briefly made to FIG. 6 showing a possible embodiment for a decoder which would be able to emulate the comfort noise at the decoding side as instructed by the encoder of FIG. 5. More generally, FIG. 6 shows a possible implementation of a decoder fitting to the encoder of FIG. 1.

In particular, the decoder of FIG. 6 comprises a decoding engine 160 so as to decode the data stream portion 44 during the active phases and a comfort noise generating part 162 for generating the comfort noise based on the information 32 and 38 provided in the data stream concerning the inactive phases 28. The comfort noise generating part 162 comprises a parametric random generator 164, an FDNS 166 and an inverse transformer (or synthesizer) 168. Modules 164 to 168 are serially connected to each other so that at the output of synthesizer 168, the comfort noise results, which fills the gap between the reconstructed audio signal as output by the decoding engine 160 during the inactive phases 28 as discussed with respect to FIG. 1. The processors FDNS 166 and inverse transformer 168 may be part of the decoding engine 160. In particular, they may be the same as FDNS 116 and 118 in FIG. 4, for example.

The mode of operation and functionality of the individual modules of FIGS. 5 and 6 will become clearer from the following discussion.

In particular, the transformer 140 spectrally decomposes the input signal into a spectrogram such as by using a lapped transform. A noise estimator 146 is configured to determine noise parameters therefrom. Concurrently, the voice or sound activity detector 16 evaluates the features derived from the input signal so as to detect whether a transition from an active phase to an inactive phase or vice versa takes place. These features used by the detector 16 may be in the form of transient/onset detector, tonality measurement, and LPC residual measurement. The transient/onset detector may be used to detect attack (sudden increase of energy) or the beginning of active speech in a clean environment or denoised signal; the tonality measurement may be used to distinguish useful background noise such as siren, telephone ringing and music; LPC residual may be used to get an indication of speech presence in the signal. Based on these features, the detector 16 can roughly give an information whether the current frame can be classified for example, as speech, silence, music, or noise.

While the noise estimator 146 may be responsible for distinguishing the noise within the spectrogram from the useful signal component therein, such as proposed in [R. Martin, Noise Power Spectral Density Estimation Based on Optimal Smoothing and Minimum Statistics, 2001], parameter estimator 148 may be responsible for statistically analyzing the noise components and determining parameters for each spectral component, for example, based on the noise component.

The noise estimator 146 may, for example, be configured to search for local minima in the spectrogram and the parameter estimator 148 may be configured to determine the noise statistics at these portions assuming that the minima in the spectrogram are primarily an attribute of the background noise rather than foreground sound.

As an intermediate note it is emphasized that it may also be possible to perform the estimation by noise estimator without the FDNS 142 as the minima do also occur in the non-shaped spectrum. Most of the description of FIG. 5 would remain the same.

Parameter quantizer 152, in turn, may be configured to parameterize the parameters estimated by parameter estimator 148. For example, the parameters may describe a mean amplitude and a first or higher order momentum of a distribution of the spectral values within the spectrogram of the input signal as far as the noise component is concerned. In order to save bitrate, the parameters may be forwarded to the data stream for insertion into the same within SID frames in a spectral resolution lower than the spectral resolution provided by transformer 140.

The stationarity measurer 150 may be configured to derive a measure of stationarity for the noise signal. The parameter estimator 148 in turn may use the measure of stationarity so as to decide whether or not a parameter update should be initiated by sending another SID frame such as frame 38 in FIG. 1 or to influence the way the parameters are estimated.

Module 152 quantizes the parameters calculated by parameter estimator 148 and LP analysis 144 and signals this to the decoding side. In particular, prior to quantizing, spectral components may be grouped into groups. Such grouping may be selected in accordance with psychoacoustical aspects such as conforming to the bark scale or the like. The detector 16 informs the quantizer 152 whether the quantization is needed to be performed or not. In case of no quantization is needed, zero frames should follow.

When transferring the description onto a concrete scenario of switching from an active phase to an inactive phase, then the modules of FIG. 5 act as follows.

During an active phase, encoding engine 14 keeps on coding the audio signal via packager into bitstream. The encoding may be performed frame-wise. Each frame of the data stream may represent one time portion/interval of the audio signal. The audio encoder 14 may be configured to encode all frames using LPC coding. The audio encoder 14 may be configured to encode some frames as described with respect to FIG. 2, called TCX frame coding mode, for example. Remaining ones may be encoded using code-excited linear prediction (CELP) coding such as ACELP coding mode, for example. That is, portion 44 of the data stream may comprise a continuous update of LPC coefficients using some LPC transmission rate which may be equal to or greater than the frame rate.

In parallel, noise estimator 146 inspects the LPC flattened (LPC analysis filtered) spectra so as to identify the minima $k_{min}$ within the TCX sprectrogram represented by the sequence of these spectra. Of course, these minima may vary in time t, i.e. $k_{min}(t)$. Nevertheless, the minima may form traces in the spectrogram output by FDNS 142, and thus, for each consecutive spectrum i at time $t_i$, the minima may be associatable with the minima at the preceding and succeeding spectrum, respectively.

The parameter estimator then derives background noise estimate parameters therefrom such as, for example, a central tendency (mean average, median or the like) m and/or dispersion (standard deviation, variance or the like) d for different spectral components or bands. The derivation may involve a statistical analysis of the consecutive spectral coefficients of the spectra of the spectrogram at the minima, thereby yielding m and d for each minimum at $k_{min}$. Interpolation along the spectral dimension between the aforementioned spectrum minima may be performed so as to obtain m and d for other predetermined spectral components or bands. The spectral resolution for the derivation and/or interpolation of the central tendency (mean average) and the derivation of the dispersion (standard deviation, variance or the like) may differ.

The just mentioned parameters are continuously updated per spectrum output by FDNS 142, for example.

As soon as detector 16 detects the entrance of an inactive phase, detector 16 may inform engine 14 accordingly so that no further active frames are forwarded to packager 154. However, the quantizer 152 outputs the just-mentioned statistical noise parameters in a first SID frame within the inactive phase, instead. The first SID frame may or may not comprise an update of the LPCs. If an LPC update is present, same may be conveyed within the data stream in the SID frame 32 in the format used in portion 44, i.e. during active phase, such as using quantization in the LSF/LSP domain, or differently, such as using spectral weightings corresponding to the LPC analysis or LPC synthesis filter's transfer function such as those which would have been applied by FDNS 142 within the framework of encoding engine 14 in proceeding with an active phase.

During the inactive phase, noise estimator 146, parameter estimator 148 and stationarity measurer 150 keep on co-operating so as to keep the decoding side updated on changes in the background noise. In particular, measurer 150 checks the spectral weighting defined by the LPCs, so as to identify changes and inform the estimator 148 when an SID frame should be sent to the decoder. For example, the measurer 150 could activate estimator accordingly whenever the aforementioned measure of stationarity indicates a degree of fluctuation in the LPCs which exceeds a certain amount. Additionally or alternatively, estimator could be triggered to send the updated parameters an a regular basis. Between these SID update frames 40, nothing would be send in the data streams, i.e. "zero frames".

At the decoder side, during the active phase, the decoding engine 160 assumes responsibility for reconstructing the audio signal. As soon as the inactive phase starts, the adaptive parameter random generator 164 uses the dequantized random generator parameters sent during the inactive phase within the data stream from parameter quantizer 150 to generate random spectral components, thereby forming a random spectrogram which is spectrally formed within the spectral energy processor 166 with the synthesizer 168 then performing a retransformation from the spectral domain into the time domain. For spectral formation within FDNS 166, either the most recent LPC coefficients from the most recent active frames may be used or the spectral weighting to be applied by FDNS 166 may be derived therefrom by extrapolation, or the SID frame 32 itself may convey the information. By this measure, at the beginning of the inactive phase, the FDNS 166 continues to spectrally weight the inbound spectrum in accordance with a transfer function of an LPC synthesis filter, with the LPS defining the LPC synthesis filter being derived from the active data portion 44 or SID frame 32. However, with the beginning of the inactive phase, the spectrum to be shaped by FDNS 166 is the randomly generated spectrum rather than a transform coded on as in case of TCX frame coding mode. Moreover, the spectral shaping applied at 166 is merely discontinuously updated by use of the SID frames 38. An interpolation or fading could be performed to gradually switch from one spectral shaping definition to the next during the interruption phases 36.

As shown in FIG. 6, the adaptive parametric random generator as 164 may additionally, optionally, use the dequantized transform coefficients as contained within the most recent portions of the last active phase in the data stream, namely within data stream portion 44 immediately before the entrance of the inactive phase. For example, the usage may be thus that a smooth transition is performed from the spectrogram within the active phase to the random spectrogram within the inactive phase.

Briefly referring back to FIGS. 1 and 3, it follows from the embodiments of FIGS. 5 and 6 (and the subsequently explained FIG. 7) that the parametric background noise estimate as generated within encoder and/or decoder, may comprise statistical information on a distribution of temporally consecutive spectral values for distinct spectral portions such as bark bands or different spectral components. For each such spectral portion, for example, the statistical information may contain a dispersion measure. The dispersion measure would, accordingly, be defined in the spectral information in a spectrally resolved manner, namely sampled at/for the spectral portions. The spectral resolution, i.e. the number of measures for dispersion and central tendency spread along the spectral axis, may differ between, for example, dispersion measure and the optionally present mean or central tendency measure. The statistical information is contained within the SID frames. It may refer to a shaped spectrum such as the LPC analysis filtered (i.e. LPC flattened) spectrum such as shaped MDCT spectrum which enables synthesis at by synthesizing a random spectrum in accordance with the statistical spectrum and de-shaping same in accordance with a LPC synthesis filter's transfer function. In that case, the spectral shaping information may be present within the SID frames, although it may be left away in the first SID frame 32, for example. However, as will be shown later, this statistical information may alternatively refer to a non-shaped spectrum. Moreover, instead of using a real valued spectrum representation such as an MDCT, a complex valued filterbank spectrum such as QMF spectrum of the audio signal may be used. For example, the QMF spectrum of the audio signal in non-shaped from may be used and statistically described by the statistical information in which case there is no spectral shaping other than contained within the statistical information itself.

Figure 7:
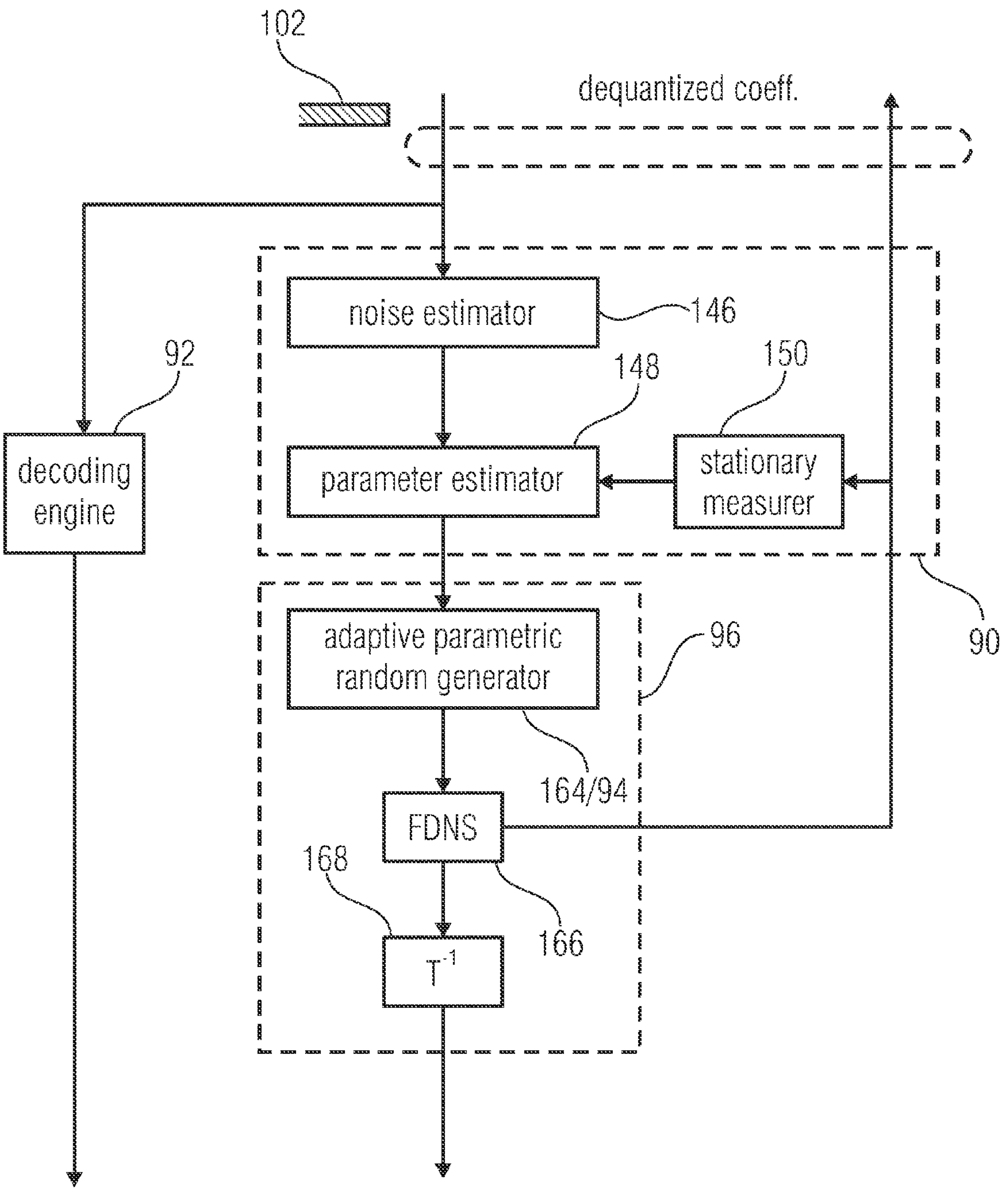
FIG. 7 shows a block diagram of an audio decoder in accordance with a further, more detailed description of the embodiment.

Similar to the relationship between the embodiment of FIG. 3 relative to the embodiment of FIG. 1, FIG. 7 shows a possible implementation of the decoder of FIG. 3. As is shown by use of the same reference signs as in FIG. 5, the decoder of FIG. 7 may comprise a noise estimator 146, a parameter estimator 148 and a stationarity measurer 150, which operate like the same elements in FIG. 5, with the noise estimator 146 of FIG. 7, however, operating on the transmitted and dequantized spectrogram such as 120 or 122 in FIG. 4. The parameter estimator 146 then operates like the one discussed in FIG. 5. The same applies with regard to the stationarity measurer 148, which operates on the energy and spectral values or LPC data revealing the temporal development of the LPC analysis filter's (or LPC synthesis filter's) spectrum as transmitted and dequantized via/from the data stream during the active phase.

While elements 146, 148 and 150 act as the background noise estimator 90 of FIG. 3, the decoder of FIG. 7 also comprises an adaptive parametric random generator 164 and an FDNS 166 as well as an inverse transformer 168 and they are connected in series to each other like in FIG. 6, so as to output the comfort noise at the output of synthesizer 168. Modules 164, 166, and 168 act as the background noise generator 96 of FIG. 3 with module 164 assuming responsibility for the functionality of the parametric random generator 94. The adaptive parametric random generator 94 or 164 outputs randomly generated spectral components of the spectrogram in accordance with the parameters determined by parameter estimator 148 which, in turn, is triggered using the stationarity measure output by stationarity measurer 150. Processor 166 then spectrally shapes the thus generated spectrogram with the invers transformer 168 then performing the transition from the spectral domain to the time domain. Note that when during inactive phase 88 the decoder is receiving the information 108, the background noise estimator 90 is performing an update of the noise estimates followed by some means of interpolation. Otherwise, if zero frames are received, it will simply do processing such as interpolation and/or fading.

Summarizing FIGS. 5 to 7, these embodiments show that it is technically possible to apply a controlled random generator 164 to excite the TCX coefficients, which can be real values such in MDCT or complex values as in FFT. It might also be advantageous to apply the random generator 164 on groups of coefficients usually achieved through filterbanks.

The random generator 164 may be controlled such that same models the type of noise as closely as possible. This could be accomplished if the target noise is known in advance. Some applications may allow this. In many realistic applications where a subject may encounter different types of noise, an adaptive method is necessitated as shown in FIGS. 5 to 7. Accordingly, an adaptive parameter random generator 164 is used which could be briefly defined as g=f (x), where $x=(x_1, x_2, \ldots)$ is a set of random generator parameters as provided by parameter estimators 146 and 150, respectively.

To make the parameter random generator adaptive, the random generator parameter estimator 146 adequately controls the random generator. Bias compensation may be included in order to compensate for the cases where the data is deemed to be statistically insufficient. This is done to generate a statistically matched model of the noise based on the past frames and it will update the estimated parameters. An example is given where the random generator 164 is supposed to generate a Gaussian noise. In this case, for example, only the mean and variance parameters may be needed and a bias can be calculated and applied to those parameters. A more advanced method can handle any type of noise or distribution and the parameters are not necessarily the moments of a distribution.

For the non-stationary noise, it needs to have a stationarity measure and a less adaptive parametric random generator can then be used. The stationarity measure determined by measurer 148 can be derived from the spectral shape of the input signal using various methods like, for example, the Itakura distance measure, the Kullback-Leibler distance measure, etc.

To handle the discontinuous nature of noise updates sent through SID frames such as illustrated by 38 in FIG. 1, additional information is usually being sent such as the energy and spectral shape of the noise. This information is useful for generating the noise in the decoder having a smooth transition even during a period of discontinuity within the inactive phase. Finally, various smoothing or filtering techniques can be applied to help improve the quality of the comfort noise emulator.

As already noted above, FIGS. 5 and 6 on the one hand and FIG. 7 on the other hand belong to different scenarios. In one scenario corresponding to FIGS. 5 and 6, parametric background noise estimation is done in the encoder based on the processed input signal and later on the parameters are transmitted to the decoder. FIG. 7 corresponds to the other scenario where the decoder can take care of the parametric background noise estimate based on the past received frames within the active phase. The use of a voice/signal activity detector or noise estimator can be beneficial to help extracting noise components even during active speech, for example.

Among the scenarios shown in FIGS. 5 to 7, the scenario of FIG. 7 may be of advantage as this scenario results in a lower bitrate being transmitted. The scenario of FIGS. 5 and 6, however, has the advantage of having a more accurate noise estimate available.

All of the above embodiments could be combined with bandwidth extension techniques such as spectral band replication (SBR), although bandwidth extension in general may be used.

Figure 8:
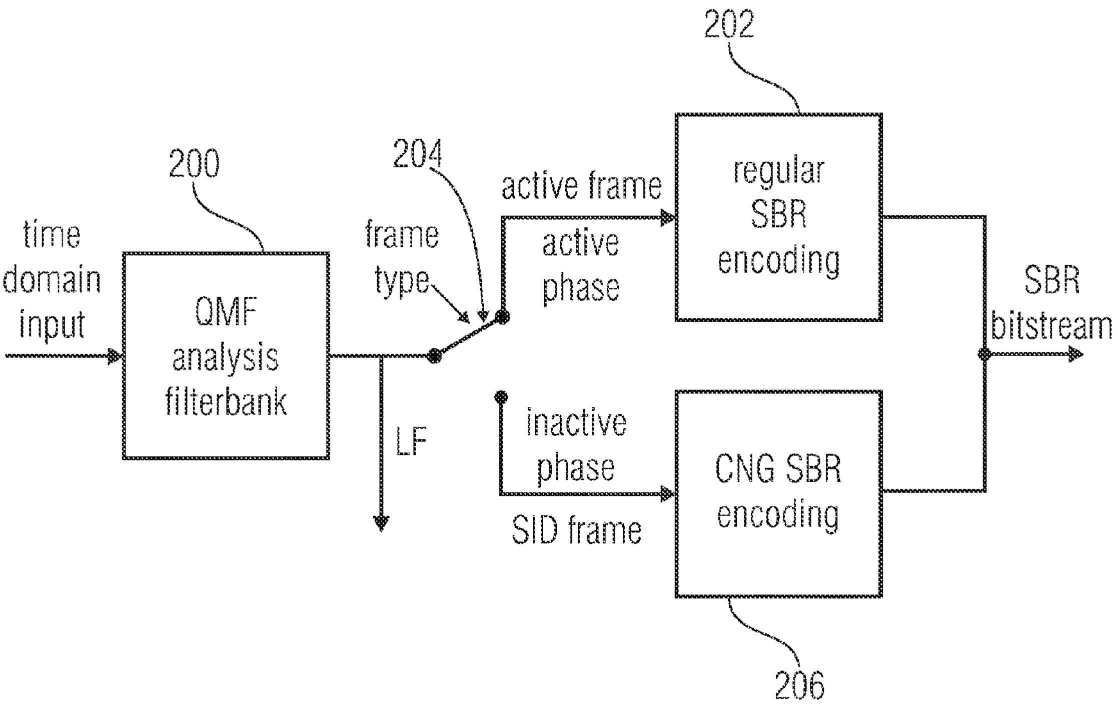
FIG. 8 shows a block diagram of a spectral bandwidth extension part of an audio encoder in accordance with an embodiment.

To illustrate this, see FIG. 8. FIG. 8 shows modules by which the encoders of FIGS. 1 and 5 could be extended to perform parametric coding with regard to a higher frequency portion of the input signal. In particular, in accordance with FIG. 8 a time domain input audio signal is spectrally decomposed by an analysis filterbank 200 such as a QMF analysis filterbank as shown in FIG. 8. The above embodiments of FIGS. 1 and 5 would then be applied only onto a lower frequency portion of the spectral decomposition generated by filterbank 200. In order to convey information on the higher frequency portion to the decoder side, parametric coding is also used. To this end, a regular spectral band replication encoder 202 is configured to parameterize the higher frequency portion during active phases and feed information thereon in the form of spectral band replication information within the data stream to the decoding side. A switch 204 may be provided between the output of QMF filterbank 200 and the input of spectral band replication encoder 202 to connect the output of filterbank 200 with an input of a spectral band replication encoder 206 connected in parallel to encoder 202 so as to assume responsibility for the bandwidth extension during inactive phases. That is, switch 204 may be controlled like switch 22 in FIG. 1. As will be outlined in more detail below, the spectral band replication encoder module 206 may be configured to operate similar to spectral band replication encoder 202: both may be configured to parameterize the spectral envelope of the input audio signal within the higher frequency portion, i.e. the remaining higher frequency portion not subject to core coding by the encoding engine, for example. However, the spectral band replication encoder module 206 may use a minimum time/frequency resolution at which the spectral envelope is parameterized and conveyed within the data stream, whereas spectral band replication encoder 202 may be configured to adapt the time/frequency resolution to the input audio signal such as depending on the occurrences of transients within the audio signal.

Figure 9:
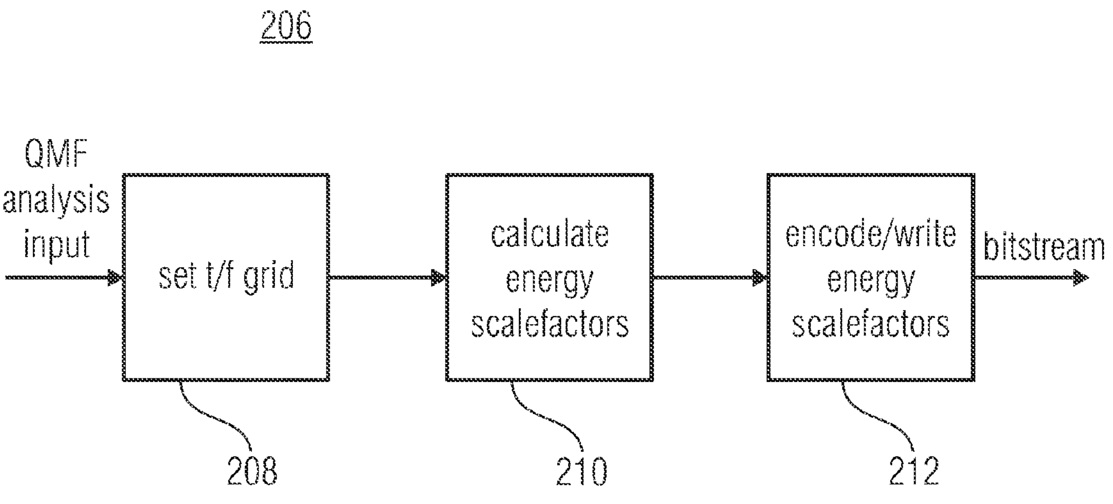
FIG. 9 shows an implementation of the CNG spectral bandwidth extension encoder of FIG. 8 in accordance with an embodiment.

FIG. 9 shows a possible implementation of the bandwidth extension encoding module 206. A time/frequency grid setter 208, an energy calculator 210 and an energy encoder 212 are serially connected to each other between an input and an output of encoding module 206. The time/frequency grid setter 208 may be configured to set the time/frequency resolution at which the envelope of the higher frequency portion is determined. For example, a minimum allowed time/frequency resolution is continuously used by encoding module 206. The energy calculator 210 may then determine the energy of the higher frequency portion of the spectrogram output by filter bank 200 within the higher frequency portion in time/frequency tiles corresponding to the time/frequency resolution, and the energy encoder 212 may use entropy coding, for example, in order to insert the energies calculated by calculator 210 into the data stream 40 (see FIG. 1) during the inactive phases such as within SID frames, such as SID frame 38.

It should be noted that the bandwidth extension information generated in accordance with the embodiments of FIGS. 8 and 9 may also be used in connection with using a decoder in accordance with any of the embodiments outlined above, such as FIGS. 3, 4 and 7.

Thus, FIGS. 8 and 9 make it clear that the comfort noise generation as explained with respect to FIGS. 1 to 7 may also be used in connection with spectral band replication. For example, the audio encoders and decoders described above may operate in different operating modes, among which some may comprise spectral band replication and some may not. Super wideband operating modes could, for example, involve spectral band replication. In any case, the above embodiments of FIGS. 1 to 7 showing examples for generating comfort noise may be combined with bandwidth extension techniques in the manner described with respect to FIGS. 8 and 9. The spectral band replication encoding module 206 being responsible for bandwidth extension during inactive phases may be configured to operate on a very low time and frequency resolution. Compared to the regular spectral band replication processing, encoder 206 may operate at a different frequency resolution which entails an additional frequency band table with very low frequency resolution along with IIR smoothing filters in the decoder for every comfort noise generating scale factor band which interpolates the energy scale factors applied in the envelope adjuster during the inactive phases. As just mentioned, the time/frequency grid may be configured to correspond to a lowest possible time resolution.

That is, the bandwidth extension coding may be performed differently in the QMF or spectral domain depending on the silence or active phase being present. In the active phase, i.e. during active frames, regular SBR encoding is carried out by the encoder 202, resulting in a normal SBR data stream which accompanies data streams 44 and 102, respectively. In inactive phases or during frames classified as SID frames, only information about the spectral envelope, represented as energy scale factors, may be extracted by application of a time/frequency grid which exhibits a very low frequency resolution, and for example the lowest possible time resolution. The resulting scale factors might be efficiently coded by encoder 212 and written to the data stream. In zero frames or during interruption phases 36, no side information may be written to the data stream by the spectral band replication encoding module 206, and therefore no energy calculation may be carried out by calculator 210.

Figure 10:
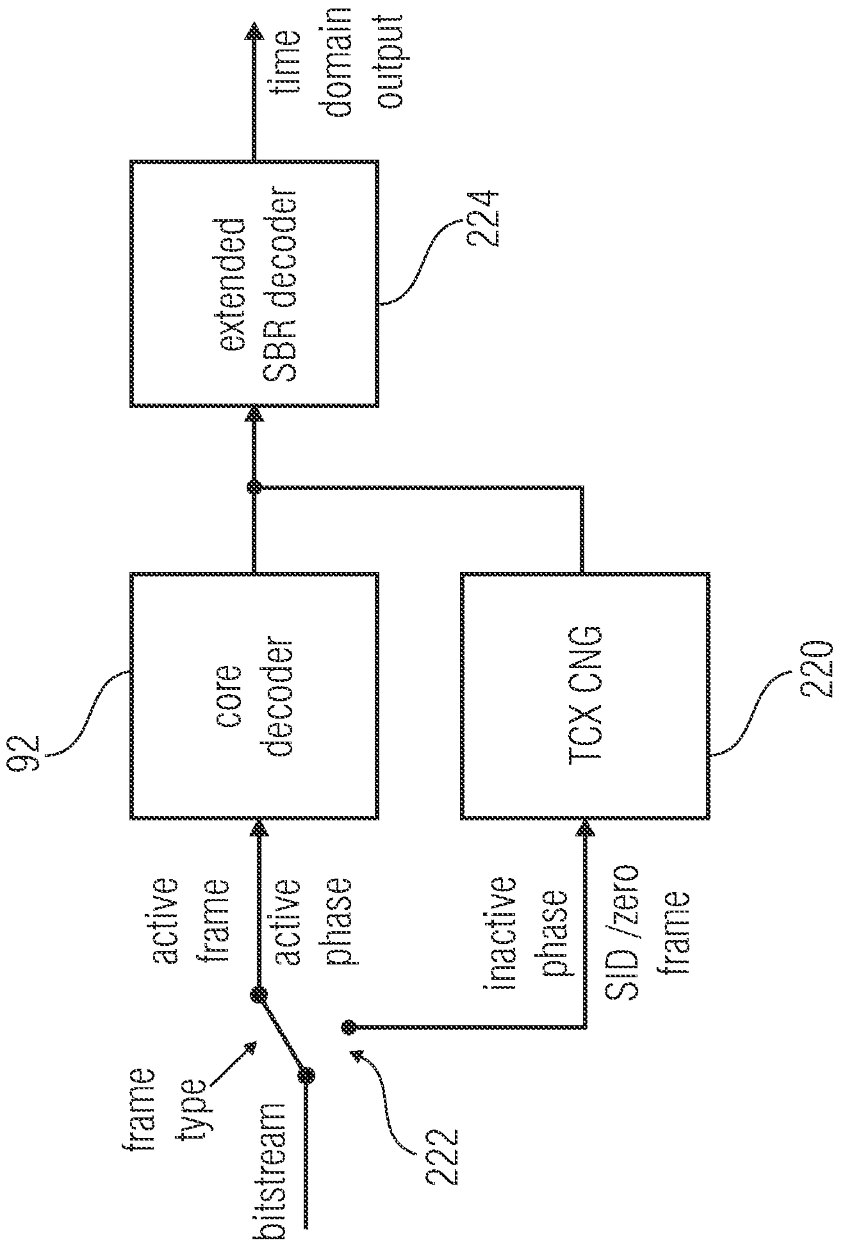
FIG. 10 shows a block diagram of an audio decoder in accordance with an embodiment using spectral bandwidth extension.

In conformity with FIG. 8, FIG. 10 shows a possible extension of the decoder embodiments of FIGS. 3 and 7 to bandwidth extension coding techniques. To be more precise, FIG. 10 shows a possible embodiment of an audio decoder in accordance with the present application. A core decoder 92 is connected in parallel to a comfort noise generator, the comfort noise generator being indicated with reference sign 220 and comprising, for example, the noise generation module 162 or modules 90, 94 and 96 of FIG. 3. A switch 222 is shown as distributing the frames within data streams 104 and 30, respectively, onto the core decoder 92 or comfort noise generator 220 depending on the frame type, namely whether the frame concerns or belongs to an active phase, or concerns or belongs to an inactive phase such as SID frames or zero frames concerning interruption phases. The outputs of core decoder 92 and comfort noise generator 220 are connected to an input of a spectral bandwidth extension decoder 224, the output of which reveals the reconstructed audio signal.

Figure 11:
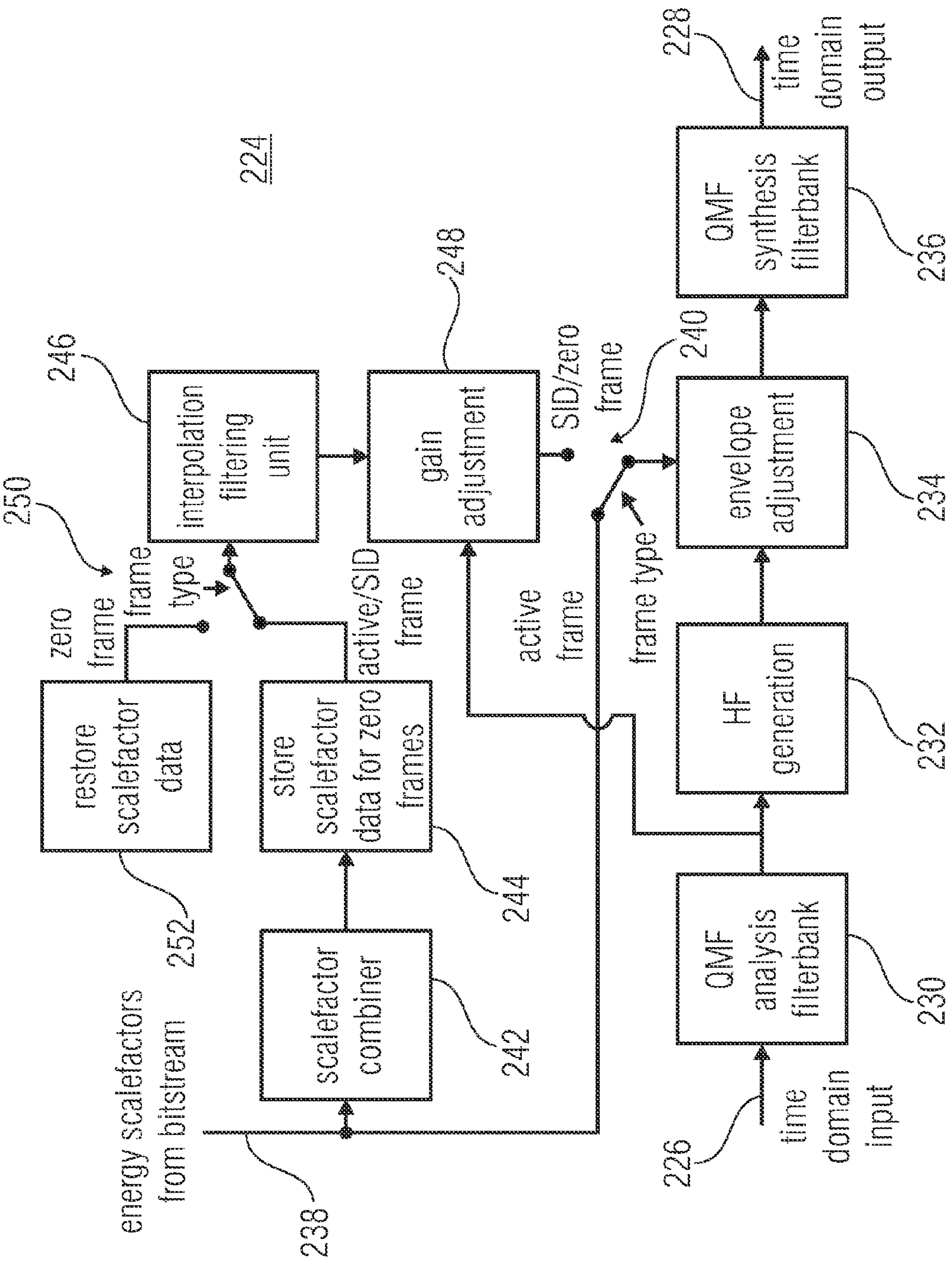
FIG. 11 shows a block diagram of a possible, more detailed description of an embodiment for an audio decoder using spectral bandwidth replication.

FIG. 11 shows a more detailed embodiment of a possible implementation of the bandwidth extension decoder 224.

As shown in FIG. 11, the bandwidth extension decoder 224 in accordance with the embodiment of FIG. 11 comprises an input 226 for receiving the time domain reconstruction of the low frequency portion of the complete audio signal to be reconstructed. It is input 226 which connects the bandwidth extension decoder 224 with the outputs of the core decoder 92 and the comfort noise generator 220 so that the time domain input at input 226 may either be the reconstructed lower frequency portion of an audio signal comprising both noise and useful component, or the comfort noise generated for bridging the time between the active phases.

As in accordance with the embodiment of FIG. 11 the bandwidth extension decoder 224 is constructed to perform a spectral bandwidth replication, the decoder 224 is called SBR decoder in the following. With respect to FIGS. 8 to 10, however, it is emphasized that these embodiments are not restricted to spectral bandwidth replication. Rather, a more general, alternative way of bandwidth extension may be used with regard to these embodiments as well.

Further, the SBR decoder 224 of FIG. 11 comprises a time-domain output 228 for outputting the finally reconstructed audio signal, i.e. either in active phases or inactive phases. Between input 226 and output 228, the SBR decoder 224 comprises—serially connected in the order of their mentioning—a spectral decomposer 230 which may be, as shown in FIG. 11, an analysis filterbank such as a QMF analysis filterbank, an HF generator 232, an envelope adjuster 234 and a spectral-to-time domain converter 236 which may be, as shown in FIG. 11, embodied as a synthesis filterbank such as a QMF synthesis filterbank.

Modules 230 to 236 operate as follows. Spectral decomposer 230 spectrally decomposes the time domain input signal so as to obtain a reconstructed low frequency portion. The HF generator 232 generates a high frequency replica portion based on the reconstructed low frequency portion and the envelope adjuster 234 spectrally forms or shapes the high frequency replica using a representation of a spectral envelope of the high frequency portion as conveyed via the SBR data stream portion and provided by modules not yet discussed but shown in FIG. 11 above the envelope adjuster 234. Thus, envelope adjuster 234 adjusts the envelope of the high frequency replica portion in accordance with the time/frequency grid representation of the transmitted high frequency envelope, and forwards the thus obtained high frequency portion to the spectral-to-temporal domain converter 236 for a conversion of the whole frequency spectrum, i.e. spectrally formed high frequency portion along with the reconstructed low frequency portion, to a reconstructed time domain signal at output 228.

As already mentioned above with respect to FIGS. 8 to 10, the high frequency portion spectral envelope may be conveyed within the data stream in the form of energy scale factors and the SBR decoder 224 comprises an input 238 in order to receive this information on the high frequency portions spectral envelope. As shown in FIG. 11, in the case of active phases, i.e. active frames present in the data stream during active phases, inputs 238 may be directly connected to the spectral envelope input of the envelope adjuster 234 via a respective switch 240. However, the SBR decoder 224 additionally comprises a scale factor combiner 242, a scale factor data store 244, an interpolation filtering unit 246 such as an IIR filtering unit, and a gain adjuster 248. Modules 242, 244, 246 and 248 are serially connected to each other between 238 and the spectral envelope input of envelope adjuster 234 with switch 240 being connected between gain adjuster 248 and envelope adjuster 234 and a further switch 250 being connected between scale factor data store 244 and filtering unit 246. Switch 250 is configured to either connect this scale factor data store 244 with the input of filtering unit 246, or a scale factor data restorer 252. In case of SID frames during inactive phases—and optionally in cases of active frames for which a very coarse representation of the high frequency portion spectral envelope is acceptable—switches 250 and 240 connect the sequence of modules 242 to 248 between input 238 and envelope adjuster 234. The scale factor combiner 242 adapts the frequency resolution at which the high frequency portions spectral envelope has been transmitted via the data stream to the resolution, which envelope adjuster 234 expects receiving and a scale factor data store 244 stores the resulting spectral envelope until a next update. The filtering unit 246 filters the spectral envelope in time and/or spectral dimension and the gain adjuster 248 adapts the gain of the high frequency portion's spectral envelope. To that end, gain adjuster may combine the envelope data as obtained by unit 246 with the actual envelope as derivable from the QMF filterbank output. The scale factor data restorer 252 reproduces the scale factor data representing the spectral envelope within interruption phases or zero frames as stored by the scale factor store 244.

Thus, at the decoder side the following processing may be carried out. In active frames or during active phases, regular spectral band replication processing may be applied. During these active periods, the scale factors from the data stream, which are typically available for a higher number of scale factor bands as compared to comfort noise generating processing, are converted to the comfort noise generating frequency resolution by the scale factor combiner 242. The scale factor combiner combines the scale factors for the higher frequency resolution to result in a number of scale factors compliant to CNG by exploiting common frequency band borders of the different frequency band tables. The resulting scale factor values at the output of the scale factor combining unit 242 are stored for the reuse in zero frames and later reproduction by restorer 252 and are subsequently used for updating the filtering unit 246 for the CNG operating mode. In SID frames, a modified SBR data stream reader is applied which extracts the scale factor information from the data stream. The remaining configuration of the SBR processing is initialized with predefined values, the time/frequency grid is initialized to the same time/frequency resolution used in the encoder. The extracted scale factors are fed into filtering unit 246, where, for example, one IIR smoothing filter interpolates the progression of the energy for one low resolution scale factor band over time. In case of zero frames, no payload is read from the bitstream and the SBR configuration including the time/frequency grid is the same as is used in SID frames. In zero frames, the smoothing filters in filtering unit 246 are fed with a scale factor value output from the scale factor combining unit 242 which have been stored in the last frame containing valid scale factor information. In case the current frame is classified as an inactive frame or SID frame, the comfort noise is generated in TCX domain and transformed back to the time domain. Subsequently, the time domain signal containing the comfort noise is fed into the QMF analysis filterbank 230 of the SBR module 224. In QMF domain, bandwidth extension of the comfort noise is performed by means of copy-up transposition within HF generator 232 and finally the spectral envelope of the artificially created high frequency part is adjusted by application of energy scale factor information in the envelope adjuster 234. These energy scale factors are obtained by the output of the filtering unit 246 and are scaled by the gain adjustment unit 248 prior to application in the envelope adjuster 234. In this gain adjustment unit 248, a gain value for scaling the scale factors is calculated and applied in order to compensate for huge energy differences at the border between the low frequency portion and the high frequency content of the signal.

Figure 12:
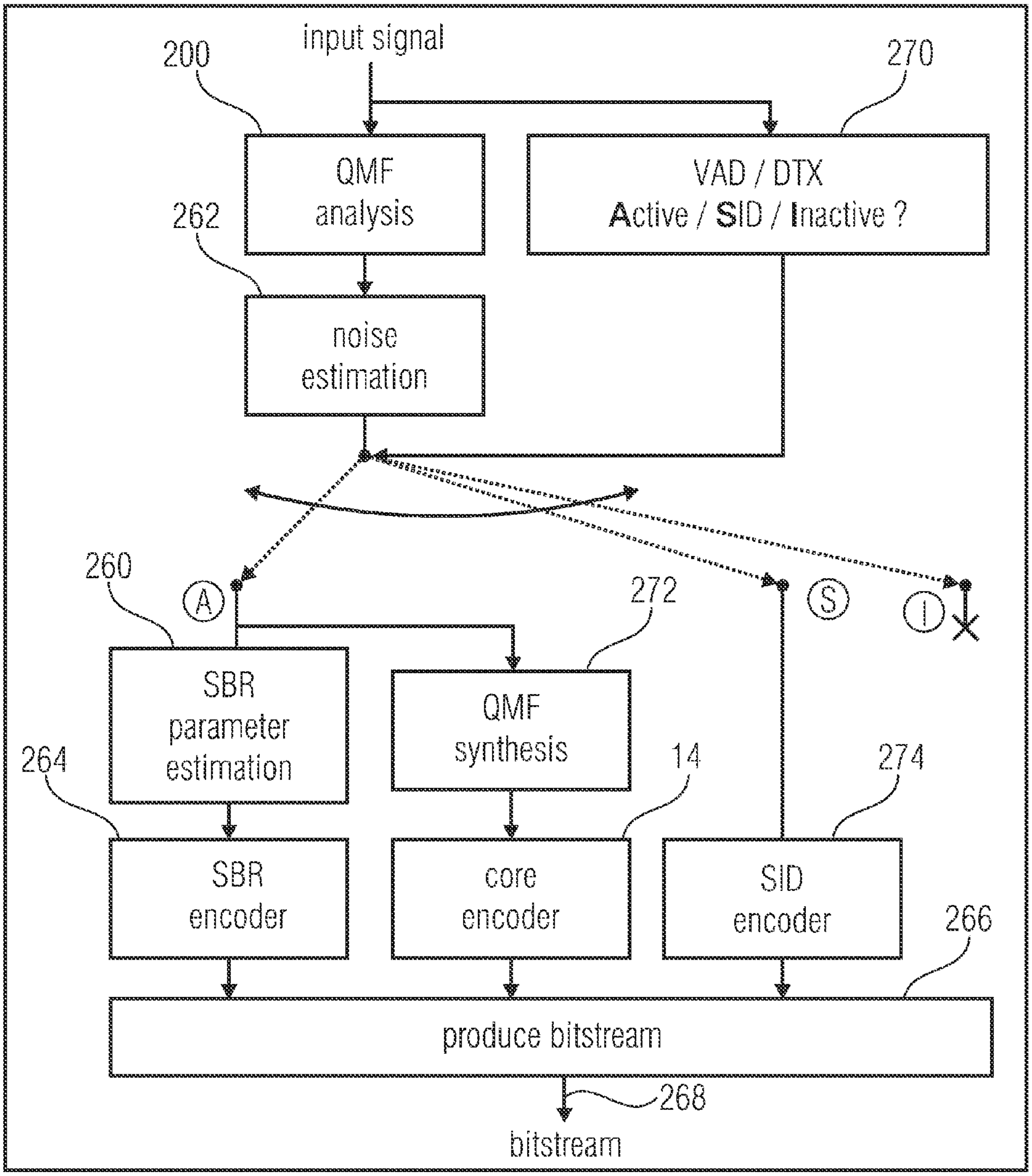
FIG. 12 shows a block diagram of an audio encoder in accordance with a further embodiment using spectral bandwidth extension.
Figure 13:
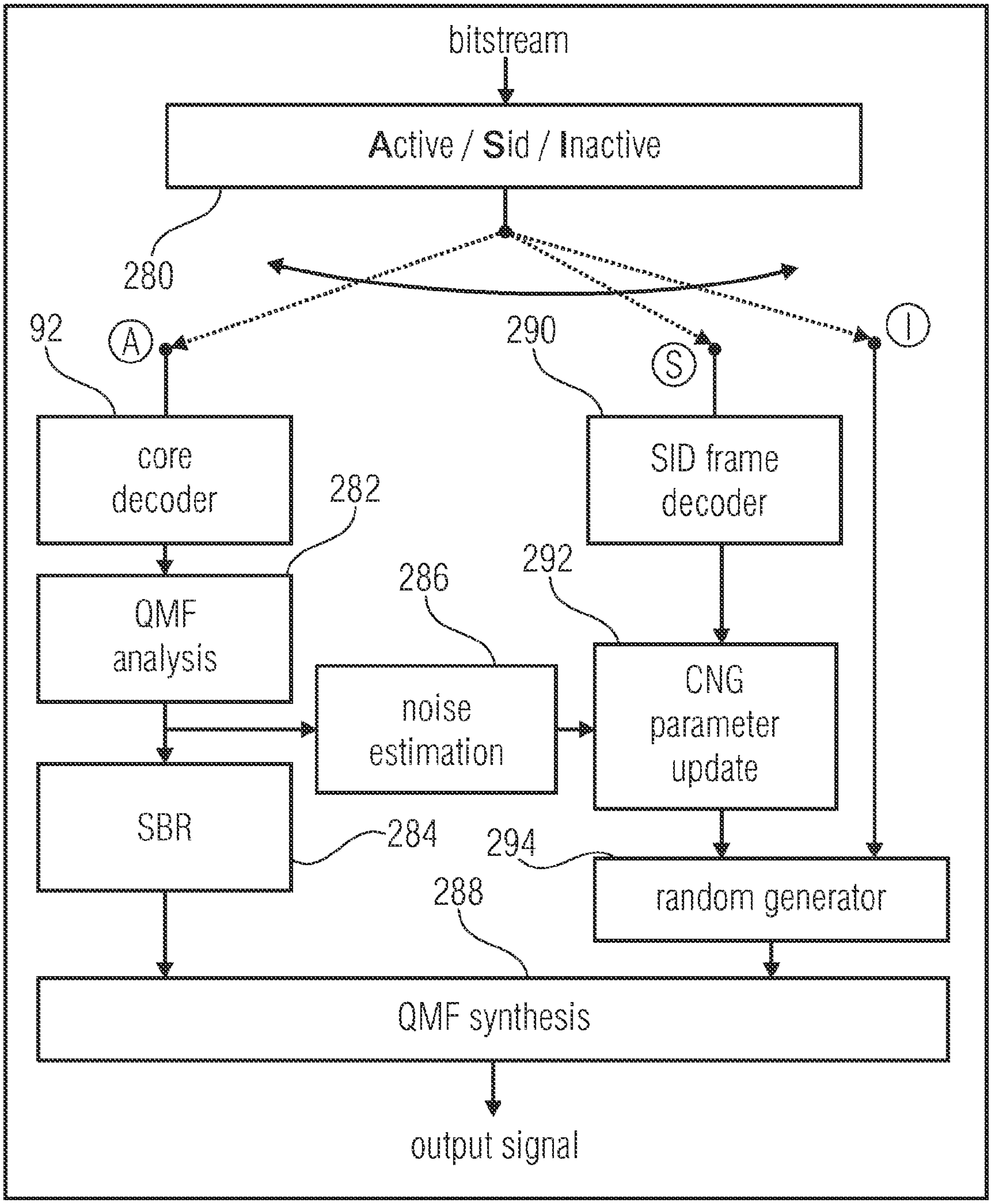
FIG. 13 shows a block diagram of a further embodiment of an audio decoder.

The embodiments described above are commonly used in the embodiments of FIGS. 12 and 13. FIG. 12 shows an embodiment of an audio encoder according to an embodiment of the present application, and FIG. 13 shows an embodiment of an audio decoder. Details disclosed with regard to these figures shall equally apply to the previously mentioned elements individually.

The audio encoder of FIG. 12 comprises a QMF analysis filterbank 200 for spectrally decomposing an input audio signal. A detector 270 and a noise estimator 262 are connected to an output of QMF analysis filterbank 200. Noise estimator 262 assumes responsibility for the functionality of background noise estimator 12. During active phases, the QMF spectra from QMF analysis filterbank are processed by a parallel connection of a spectral band replication parameter estimator 260 followed by some SBR encoder 264 on the one hand, and a concatenation of a QMF synthesis filterbank 272 followed by a core encoder 14 on the other hand. Both parallel paths are connected to a respective input of bitstream packager 266. In case of outputting SID frames, SID frame encoder 274 receives the data from the noise estimator 262 and outputs the SID frames to bitstream packager 266.

The spectral bandwidth extension data output by estimator 260 describe the spectral envelope of the high frequency portion of the spectrogram or spectrum output by the QMF analysis filterbank 200, which is then encoded, such as by entropy coding, by SBR encoder 264. Data stream multiplexer 266 inserts the spectral bandwidth extension data in active phases into the data stream output at an output 268 of the multiplexer 266.

Detector 270 detects whether currently an active or inactive phase is active. Based on this detection, an active frame, an SID frame or a zero frame, i.e. inactive frame, is to currently be output. In other words, module 270 decides whether an active phase or an inactive phase is active and if the inactive phase is active, whether or not an SID frame is to be output. The decisions are indicated in FIG. 12 using I for zero frames, A for active frames, and S for SID frames. A frames which correspond to time intervals of the input signal where the active phase is present are also forwarded to the concatenation of the QMF synthesis filterbank 272 and the core encoder 14. The QMF synthesis filterbank 272 has a lower frequency resolution or operates at a lower number of QMF subbands when compared to QMF analysis filterbank 200 so as to achieve by way of the subband number ratio a corresponding downsampling rate in transferring the active frame portions of the input signal to the time domain again. In particular, the QMF synthesis filterbank 272 is applied to the lower frequency portions or lower frequency subbands of the QMF analysis filterbank spectrogram within the active frames. The core coder 14 thus receives a downsampled version of the input signal, which thus covers merely a lower frequency portion of the original input signal input into QMF analysis filterbank 200. The remaining higher frequency portion is parametrically coded by modules 260 and 264.

SID frames (or, to be more precise, the information to be conveyed by same) are forwarded to SID encoder 274, which assumes responsibility for the functionalities of module 152 of FIG. 5, for example. The only difference: module 262 operates on the spectrum of input signal directly—without LPC shaping. Moreover, as the QMF analysis filtering is used, the operation of module 262 is independent from the frame mode chosen by the core coder or the spectral bandwidth extension option being applied or not. The functionalities of module 148 and 150 of FIG. 5 may be implemented within module 274.

Multiplexer 266 multiplexes the respective encoded information into the data stream at output 268.

The audio decoder of FIG. 13 is able to operate on a data stream as output by the encoder of FIG. 12. That is, a module 280 is configured to receive the data stream and to classify the frames within the data stream into active frames, SID frames and zero frames, i.e. a lack of any frame in the data stream, for example. Active frames are forwarded to a concatenation of a core decoder 92, a QMF analysis filterbank 282 and a spectral bandwidth extension module 284. Optionally, a noise estimator 286 is connected to QMF analysis filterbank's output. The noise estimator 286 may operate like, and may assume responsibility for the functionalities of, the background noise estimator 90 of FIG. 3, for example, with the exception that the noise estimator operates on the un-shaped spectra rather than the excitation spectra. The concatenation of modules 92, 282 and 284 is connected to an input of a QMF synthesis filterbank 288. SID frames are forwarded to an SID frame decoder 290 which assumes responsibility for the functionality of the background noise generator 96 of FIG. 3, for example. A comfort noise generating parameter updater 292 is fed by the information from decoder 290 and noise estimator 286 with this updater 292 steering the random generator 294, which assumes responsibility for the parametric random generators functionality of FIG. 3. As inactive or zero frames are missing, they do not have to be forwarded anywhere, but they trigger another random generation cycle of random generator 294. The output of random generator 294 is connected to QMF synthesis filterbank 288, the output of which reveals the reconstructed audio signal in silence and active phases in time domain.

Thus, during active phases, the core decoder 92 reconstructs the low-frequency portion of the audio signal including both noise and useful signal components. The QMF analysis filterbank 282 spectrally decomposes the reconstructed signal and the spectral bandwidth extension module 284 uses spectral bandwidth extension information within the data stream and active frames, respectively, in order to add the high frequency portion. The noise estimator 286, if present, performs the noise estimation based on a spectrum portion as reconstructed by the core decoder, i.e. the low frequency portion. In inactive phases, the SID frames convey information parametrically describing the background noise estimate derived by the noise estimation 262 at the encoder side. The parameter updater 292 may primarily use the encoder information in order to update its parametric background noise estimate, using the information provided by the noise estimator 286 primarily as a fallback position in case of transmission loss concerning SID frames. The QMF synthesis filterbank 288 converts the spectrally decomposed signal as output by the spectral band replication module 284 in active phases and the comfort noise generated signal spectrum in the time domain. Thus, FIGS. 12 and 13 make it clear that a QMF filterbank framework may be used as a basis for QMF-based comfort noise generation. The QMF framework provides a convenient way to resample the input signal down to a core-coder sampling rate in the encoder, or to upsample the core-decoder output signal of core decoder 92 at the decoder side using the QMF synthesis filterbank 288. At the same time, the QMF framework can also be used in combination with bandwidth extension to extract and process the high frequency components of the signal which are left over by the core coder and core decoder modules 14 and 92. Accordingly, the QMF filterbank can offer a common framework for various signal processing tools. In accordance with the embodiments of FIGS. 12 and 13, comfort noise generation is successfully included into this framework.

In particular, in accordance with the embodiments of FIGS. 12 and 13, it may be seen that it is possible to generate comfort noise at the decoder side after the QMF analysis, but before the QMF synthesis by applying a random generator 294 to excite the real and imaginary parts of each QMF coefficient of the QMF synthesis filterbank 288, for example. The amplitude of the random sequences are, for example, individually computed in each QMF band such that the spectrum of the generated comfort noise resembles the spectrum of the actual input background noise signal. This can be achieved in each QMF band using a noise estimator after the QMF analysis at the encoding side. These parameters can then be transmitted through the SID frames to update the amplitude of the random sequences applied in each QMF band at the decoder side.

Ideally, note that the noise estimation 262 applied at the encoder side should be able to operate during both inactive (i.e., noise-only) and active periods (typically containing noisy speech) so that the comfort noise parameters can be updated immediately at the end of each active period. In addition, noise estimation might be used at the decoder side as well. Since noise-only frames are discarded in a DTX-based coding/decoding system, the noise estimation at the decoder side is favorably able to operate on noisy speech contents. The advantage of performing the noise estimation at the decoder side, in addition to the encoder side, is that the spectral shape of the comfort noise can be updated even when the packet transmission from the encoder to the decoder fails for the first SID frame(s) following a period of activity.

The noise estimation should be able to accurately and rapidly follow variations of the background noise's spectral content and ideally it should be able to perform during both active and inactive frames, as stated above. One way to achieve these goals is to track the minima taken in each band by the power spectrum using a sliding window of finite length, as proposed in [R. Martin, Noise Power Spectral Density Estimation Based on Optimal Smoothing and Minimum Statistics, 2001]. The idea behind it is that the power of a noisy-speech spectrum frequently decays to the power of the background noise, e.g., between words or syllables. Tracking the minimum of the power spectrum provides therefore an estimate of the noise floor in each band, even during speech activity. However, these noise floors are underestimated in general. Furthermore, they do not allow to capture quick fluctuations of the spectral powers, especially sudden energy increases.

Nevertheless, the noise floor computed as described above in each band provides very useful side-information to apply a second stage of noise estimation. In fact, we can expect the power of a noisy spectrum to be close to the estimated noise floor during inactivity, whereas the spectral power will be far above the noise floor during activity. The noise floors computed separately in each band can hence be used as rough activity detectors for each band. Based on this knowledge, the background noise power can be easily estimated as a recursively smoothed version of the power spectrum as follows:

$$\sigma_N^2(m,k)=\beta(m,k)*\sigma_N^2(m-1,k)+(1-\beta(m,k))*\sigma_x^2(m,k)$$

where $\sigma_x^2(m,k)$ denotes the power spectral density of the input signal at the frame m and band k, $\sigma_N^2(m,k)$ refers the noise power estimate, and $\beta(m,k)$ is a forgetting factor (between 0 and 1) controlling the amount of smoothing for each band and each frame separately. Using the noise floor information to reflect the activity status, it should take a small value during inactive periods (i.e., when the power spectrum is close to the noise floor), whereas a high value should be chosen to apply more smoothing (ideally keeping $\sigma_N^2(m,k)$ constant) during active frames. To achieve this, a soft decision may be made by computing the forgetting factors as follows:

$$\beta(m,k)=1-e^{-a\left(\frac{\sigma_X^2(m,k)}{\sigma_{NF}^2(m,k)}-1\right)}$$

where $\sigma_{NF}^2$ is the noise floor power and a is a control parameter. A higher value for a results in larger forgetting factors and hence causes overall more smoothing.

Thus, a Comfort Noise Generation (CNG) concept has been described where the artificial noise is produced at the decoder side in a transform domain. The above embodiments can be applied in combination with virtually any type of spectro-temporal analysis tool (i.e., a transform or filterbank) decomposing a time-domain signal into multiple spectral bands.

Thus, the above embodiments, inter alias, described a TCX-based CNG where a basic comfort noise generator employs random pulses to model the residual.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An audio encoder comprising:

a background noise estimator configured to continuously update a parametric background noise estimate during an active phase based on an input audio signal;

an encoder for encoding the input audio signal into a data stream during the active phase; and a detector configured to detect an entrance of an inactive phase following the active phase based on the input audio signal, wherein the audio encoder is configured to, upon detection of the entrance of the inactive phase, encode into the data stream the parametric background noise estimate as continuously updated during the active phase which the inactive phase detected follows.

2. The audio encoder according to claim 1, wherein the background noise estimator is configured to, in continuously updating the parametric background noise estimate, distinguish between a noise component and a useful signal component within the input audio signal and to determine the parametric background noise estimate merely from the noise component.

3. The audio encoder according to claim 1, wherein the encoder is configured to, in encoding the input audio signal, predictively code the input audio signal into linear prediction coefficients and an excitation signal, and transform code the excitation signal, and code the linear prediction coefficients into the data stream.

4. The audio encoder according to claim 3, wherein the background noise estimator is configured to update the parametric background noise estimate using the excitation signal during the active phase.

5. The audio encoder according to claim 3, wherein the background noise estimator is configured to, in updating the parametric background noise estimate, identify local minima in the excitation signal and to perform statistical analysis of the excitation signal at the local minima so as to derive the parametric background noise estimate.

6. The audio encoder according to claim 1, wherein the encoder is configured to, in encoding the input audio signal, use predictive and/or transform coding to encode a lower frequency portion of the input audio signal, and to use parametric coding to encode a spectral envelope of a higher frequency portion of the input audio signal.

7. The audio encoder according to claim 6, wherein the encoder is configured to interrupt the predictive and/or transform coding and the parametric coding in inactive phases or to interrupt the predictive and/or transform coding and perform the parametric coding of the spectral envelope of the higher frequency portion of the input audio signal at a lower time/frequency resolution compared to the use of the parametric coding in the active phase.

8. The audio encoder according to claim 6, wherein the encoder uses a filterbank in order to spectrally decompose the input audio signal into a set of subbands forming the lower frequency portion, and a set of subbands forming the higher frequency portion.

9. The audio encoder according to claim 8, wherein the background noise estimator is configured to update the parametric background noise estimate in the active phase based on the lower and higher frequency portions of the input audio signal.

10. The audio encoder according to claim 9, wherein the background noise estimator is configured to, in updating the parametric background noise estimate, identify local minima in the lower and higher frequency portions of the input audio signal and to perform statistical analysis of the lower and higher frequency portions of the input audio signal at the local minima so as to derive the parametric background noise estimate.

11. The audio encoder according to claim 1, wherein the encoder is configured to, in encoding the input audio signal, use predictive and/or transform coding to encode a lower frequency portion of the input audio signal, and to choose between using parametric coding to encode a spectral envelope of a higher frequency portion of the input audio signal or leaving the higher frequency portion of the input audio signal un-coded.

12. The audio encoder according to claim 1, wherein the background noise estimator is configured to continue continuously updating the parametric background noise estimate even during the inactive phase, wherein the audio encoder is configured to intermittently encode updates of the parametric background noise estimate as continuously updated during the inactive phase.

13. The audio encoder according to claim 12, wherein the audio encoder is configured to intermittently encode the updates of the parametric background noise estimate in a fixed or variable interval of time.

14. An audio decoder for decoding a data stream so as to reconstruct therefrom an audio signal, the data stream comprising at least an active phase followed by an inactive phase, the audio decoder comprising:

a background noise estimator configured to continuously update a parametric background noise estimate from the data stream during the active phase;

a decoder configured to reconstruct the audio signal from the data stream during the active phase;

a parametric random generator;

a background noise generator configured to synthesize the audio signal during the inactive phase by controlling the parametric random generator during the inactive phase depending on the parametric background noise estimate;

wherein the decoder is configured to, in reconstructing the audio signal from the data stream, shape an excitation signal transform coded into the data stream, according to linear prediction coefficients also coded into the data stream; and wherein the background noise estimator is configured to update the parametric background noise estimate using the excitation signal.

15. The audio decoder according to claim 14, wherein the background noise estimator is configured to, in continuously updating the parametric background noise estimate, distinguish between a noise component and a useful signal component within a version of the audio signal as reconstructed from the data stream in the active phase, and to determine the parametric background noise estimate merely from the noise component.

16. The audio decoder according to claim 14, wherein the background noise estimator is configured to, in updating the parametric background noise estimate, identify local minima in the excitation signal and to perform a statistical analysis of the excitation signal at the local minima so as to derive the parametric background noise estimate.

17. The audio decoder according to claim 14, wherein the decoder is configured to, in reconstructing the audio signal, use predictive and/or transform decoding to reconstruct a lower frequency portion of the audio signal from the data stream, and to synthesize a higher frequency portion of the audio signal.

18. The audio decoder according to claim 17, wherein the decoder is configured to synthesize the higher frequency portion of the audio signal from a spectral envelope of the higher frequency portion of the input audio signal, parametrically encoded into the data stream, or to synthesize the higher frequency portion of the audio signal by blind bandwidth extension based on the lower frequency portion.

19. The audio decoder according to claim 18, wherein the decoder is configured to interrupt the predictive and/or transform decoding in inactive phases and perform the synthesizing of the higher frequency portion of the audio signal by spectrally forming a replica of the lower frequency portion of the audio signal according to the spectral envelope in the active phase, and spectrally forming a replica of the synthesized audio signal according to the spectral envelope in the inactive phase.

20. The audio decoder according to claim 18, wherein the decoder comprises an inverse filterbank in order to spectrally compose the input audio signal from a set of subbands of the lower frequency portion, and a set of subbands of the higher frequency portion.

21. The audio decoder according to claim 14, wherein the audio decoder is configured to detect an entrance of the inactive phase whenever the data stream is interrupted, and/or whenever the data stream signals the entrance of the data stream.

22. The audio decoder according to claim 14, wherein the background noise generator is configured to synthesize the audio signal during the inactive phase by controlling the parametric random generator during the inactive phase depending on the parametric background noise estimate as continuously updated by the background noise estimator merely in case of the absence of any parametric background noise estimate information in the data stream immediately after a transition from an active phase to an inactive phase.

23. The audio decoder according to claim 14, wherein the background noise estimator is configured to, in continuously updating the parametric background noise estimate, use a spectral decomposition of the audio signal as reconstructed from the decoder.

24. The audio decoder according to claim 14, wherein the background noise estimator is configured to, in continuously updating the parametric background noise estimate, use a QMF spectrum of the audio signal as reconstructed from the decoder.

25. An audio encoding method comprising:

continuously updating a parametric background noise estimate during an active phase based on an input audio signal;

encoding the input audio signal into a data stream during the active phase;

detecting an entrance of an inactive phase following the active phase based on the input audio signal; and upon detection of the entrance of the inactive phase, encoding into the data stream the parametric background noise estimate as continuously updated during the active phase which the inactive phase detected follows.

26. An audio decoding method for decoding a data stream so as to reconstruct therefrom an audio signal, the data stream comprising at least an active phase followed by an inactive phase, the method comprising:

continuously updating a parametric background noise estimate from the data stream during the active phase;

reconstructing the audio signal from the data stream during the active phase;

synthesizing the audio signal during the inactive phase by controlling a parametric random generator during the inactive phase depending on the parametric background noise estimate;

wherein the reconstruction of the audio signal from the data stream comprises shaping an excitation signal transform coded into the data stream, according to linear prediction coefficients also coded into the data stream, and wherein the continuous update of the parametric background noise estimate is performed using the excitation signal.

27. A non-transitory computer-readable medium having stored thereon a computer program comprising a program code for performing, when running on a computer, a method according to claim 25.

28. A non-transitory computer-readable medium having stored thereon a computer program comprising a program code for performing, when running on a computer, a method according to claim 26.

* * * * *

UNITED STATES PATENT AND TRADEMARK OFFICE

CERTIFICATE OF CORRECTION

PATENT NO. : 9,153,236 B2
APPLICATION NO. : 13/966087
DATED : October 6, 2015
INVENTOR(S) : Setiawan et al.

It is certified that error appears in the above-identified patent and that said Letters Patent is hereby corrected as shown below:

Claims

Claim 18, column 26, line 16:
"...portion of the input audio signal,..." should read:
"...portion of the audio signal,..."

Claim 20, column 26, line 31:
"...compose the input audio signal..." should read:
"...compose the audio signal..."

Signed and Sealed this
Twelfth Day of July, 2016

Michelle K. Lee

Michelle K. Lee
*Director of the United States Patent and Trademark Office*